United States Patent
Seregin et al.

(10) Patent No.: US 12,401,785 B2
(45) Date of Patent: *Aug. 26, 2025

(54) MOTION COMPENSATION USING SIZE OF REFERENCE PICTURE

(71) Applicant: QUALCOMM Incorporated, San Diego, CA (US)

(72) Inventors: Vadim Seregin, San Diego, CA (US); Yao-Jen Chang, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,909

(22) Filed: Feb. 17, 2023

(65) Prior Publication Data

US 2023/0283769 A1 Sep. 7, 2023

Related U.S. Application Data

(63) Continuation of application No. 17/125,486, filed on Dec. 17, 2020, now Pat. No. 11,589,037.

(Continued)

(51) Int. Cl.
*H04N 19/105* (2014.01)
*H04N 19/176* (2014.01)
*H04N 19/503* (2014.01)

(52) U.S. Cl.
CPC ......... *H04N 19/105* (2014.11); *H04N 19/176* (2014.11); *H04N 19/503* (2014.11)

(58) Field of Classification Search
None
See application file for complete search history.

(56) References Cited

U.S. PATENT DOCUMENTS

| 9,628,795 B2 | 4/2017 | Zhang et al. |
| 9,924,191 B2 | 3/2018 | Chen et al. |

(Continued)

FOREIGN PATENT DOCUMENTS

| KR | 20190140387 A | 12/2019 |
| WO | 2015200835 A1 | 12/2015 |

(Continued)

OTHER PUBLICATIONS

Bross B., et al., "Versatile Video Coding (Draft 6)", 127th MPEG, Jul. 8, 2019-Jul. 12, 2019, 15th JVET Meeting, Gothenburg, SE, Jul. 3, 2019-Jul. 12, 2019, Joint Video Experts Team (JVET) of ITU-T SG 16 WP 3 and ISO/IEC JTC 1/SC 29/WG 11, 15th Meeting (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages.

(Continued)

*Primary Examiner* — Chikaodili E Anyikire
(74) *Attorney, Agent, or Firm* — Shumaker & Sieffert, P.A.

(57) ABSTRACT

A video coder is configured to determine a reference block of a reference picture for prediction of a current block of a current picture using motion information and to generate a set of reference samples for the current block of the current picture. To generate the set of reference samples, the video coder is configured to perform reference sample clipping on the reference block of the reference picture based on a size of the reference picture. The video coder is further configured to generate a prediction block for the current block of the current picture based on the set of reference samples.

43 Claims, 10 Drawing Sheets

Related U.S. Application Data

(60) Provisional application No. 62/954,204, filed on Dec. 27, 2019, provisional application No. 62/951,709, filed on Dec. 20, 2019.

(56) References Cited

U.S. PATENT DOCUMENTS

| | | | |
|---|---|---|---|
| 10,412,387 B2 | 9/2019 | Pang et al. | |
| 11,425,391 B2 | 8/2022 | Lim et al. | |
| 11,589,037 B2 | 2/2023 | Seregin et al. | |
| 2011/0090963 A1 | 4/2011 | Po et al. | |
| 2017/0085917 A1* | 3/2017 | Hannuksela | H04N 19/136 |
| 2018/0124420 A1 | 5/2018 | Lee et al. | |
| 2019/0014342 A1 | 1/2019 | Li et al. | |
| 2019/0082184 A1* | 3/2019 | Hannuksela | H04N 13/15 |
| 2019/0158827 A1 | 5/2019 | Sim et al. | |
| 2020/0260070 A1* | 8/2020 | Yoo | H04N 19/12 |
| 2021/0092447 A1* | 3/2021 | Choi | H04N 19/186 |
| 2021/0160482 A1* | 5/2021 | Chiu | H04N 19/59 |
| 2021/0409718 A1 | 12/2021 | Wieckowski et al. | |
| 2022/0060692 A1* | 2/2022 | Zhang | H04N 19/176 |
| 2022/0132104 A1* | 4/2022 | Zhang | H04N 19/105 |

FOREIGN PATENT DOCUMENTS

| | | |
|---|---|---|
| WO | 2016029144 | 2/2016 |
| WO | 2019135447 A1 | 7/2019 |

OTHER PUBLICATIONS

Bross B., et al., "Versatile Video Coding (Draft 7)", 16th JVET Meeting, Oct. 1, 2019-Oct. 11, 2019, Geneva, CH (The Joint Video Exploration Team of ISO/IEC JTC1/SC29/WG11 and ITU-T SG. 16), No. JVET-P2001, m51515, Nov. 14, 2019 (Nov. 14, 2019), XP030224328, 493 Pages.

He (Interdigital) Y., et al., "AHG12: On Subpicture Wraparound Motion Compensation Signaling", 16. JVET Meeting; Oct. 1, 2019-Oct. 11, 2019; Geneva; (The Joint Video Exploration Team of ISO/IEC JTC1/SC29/WG11 and ITU-T SG.16), No. JVET-P0127, Sep. 24, 2019 (Sep. 24, 2019), pp. 1-4, XP030216318, Abstract and Introduction; p. 1. paragraph 1; figure 1 Subpicture wrap around syntax, p. 2. paragraph 2; figure 2, Subpicture decoding process; p. 3, paragraph 2.2.

International Search Report and Written Opinion—PCT/US2020/066004—ISA/EPO—Feb. 12, 2021.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Seregin (Qualcomm) V., et al., "AHG12: On Motion Compensation for Sub-Pictures", 17. JVET Meeting; Jan. 7, 2020-Jan. 17, 2020; Brussels; (The Joint Video Exploration Team of ISO/IEC JTC1/SC29/WG11 and ITU-T SG.16), No. JVET-Q0157, m51746, Dec. 29, 2019 (Dec. 29, 2019), pp. 1-5, XP030222724, Abstract; Problem statement; Proposal; p. 1, paragraph 1—p. 3, paragraph 2; figures 1-2, Section 1.

Wang (Bytedance) Y-K., "AHG12: A Summary of Proposals on General and Misc. Subpicture Aspects", 17. JVET Meeting; Jan. 7, 2020-Jan. 17, 2020; Brussels; (The Joint Video Exploration Team of ISO/IEC JTC1/SC29/WG11 and ITU-T SG. 16), No. JVET-Q0592, Jan. 6, 2020 (Jan. 6, 2020), pp. 1-4, XP030223929, summaries and references to jvet contributions related to clipping of motion vectors pointing to reference blocks at the border of reference images; p. 2-p. 3.

Taiwan Search Report—TW109144979—TIPO—Jan. 31, 2024.

* cited by examiner

MOTION COMPENSATION USING SIZE OF REFERENCE PICTURE

This Application for Patent is a Continuation of U.S. Pat. No. 11,589,037, issued on Feb. 21, 2023, which claims the benefit of U.S. Provisional Application No. 62/951,709, filed Dec. 20, 2019 and U.S. Provisional Application No. 62/954,204, filed Dec. 27, 2019, the entire contents of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for improving an accuracy of video coding when a current picture and reference picture have different sizes and/or when using sub-pictures. For example, when generating a set of reference samples, a video coder (e.g., a video encoder or a video decoder) may perform reference sample clipping on a reference block that has a different number of samples than a current picture. In this example, when performing the clipping on the reference block, the video coder may clip reference samples using a size of the reference picture instead of a current picture size. For instance, a particular edge reference sample may be arranged at a rightmost position of the size of the reference picture (e.g., picW−1). In this instance, the video coder may set a position for all samples to the right of the particular edge reference sample to set values equal to the particular edge reference sample. In this way, the video coder may "clip" the reference sample position to be within the reference picture. Said differently, the video coder may effectively "pad" the reference samples positioned to the right of the particular edge reference sample with the particular edge reference sample value.

In one example, this disclosure describes a method of decoding video data includes determining a reference block of a reference picture for prediction of a current block of a current picture using motion information; generating a set of reference samples for the current block of the current picture, wherein generating the set of reference samples comprises performing reference sample clipping on the reference block of the reference picture based on a size of the reference picture; and generating a prediction block for the current block of the current picture based on the set of reference samples.

In another example, this disclosure describes a device includes a memory configured to store video data and one or more processors implemented in circuitry and configured to determine a reference block of a reference picture for prediction of a current block of a current picture using motion information. The one or more processors are further configured to generate a set of reference samples for the current block of the current picture, wherein, to generate the set of reference samples, the one or more processors are configured to perform reference sample clipping on the reference block of the reference picture based on a size of the reference picture. The one or more processors are further configured to generate a prediction block for the current block of the current picture based on the set of reference samples.

In another example, this disclosure describes a computer-readable storage medium having stored thereon instructions that, when executed, cause a processor to determine a reference block of a reference picture for prediction of a current block of a current picture using motion information. The instructions further cause the processor to generate a set of reference samples for the current block of the current picture, wherein, to generate the set of reference samples, the instructions cause the processor to perform reference sample clipping on the reference block of the reference picture based on a size of the reference picture; and generate a prediction block for the current block of the current picture based on the set of reference samples.

In one example, this disclosure describes an apparatus comprising means for determining a reference block of a reference picture for prediction of a current block of a current picture using motion information. The apparatus further comprises means for generating a set of reference samples for the current block of the current picture, wherein the means for generating the set of reference samples comprises performing reference sample clipping on the reference block of the reference picture based on a size of the reference picture. The apparatus further comprises means for generating a prediction block for the current block of the current picture based on the set of reference samples.

The details of one or more examples are set forth in the accompanying drawings and the description below. Other features, objects, and advantages will be apparent from the description, drawings, and claims.

DETAILED DESCRIPTION

Figure 1:
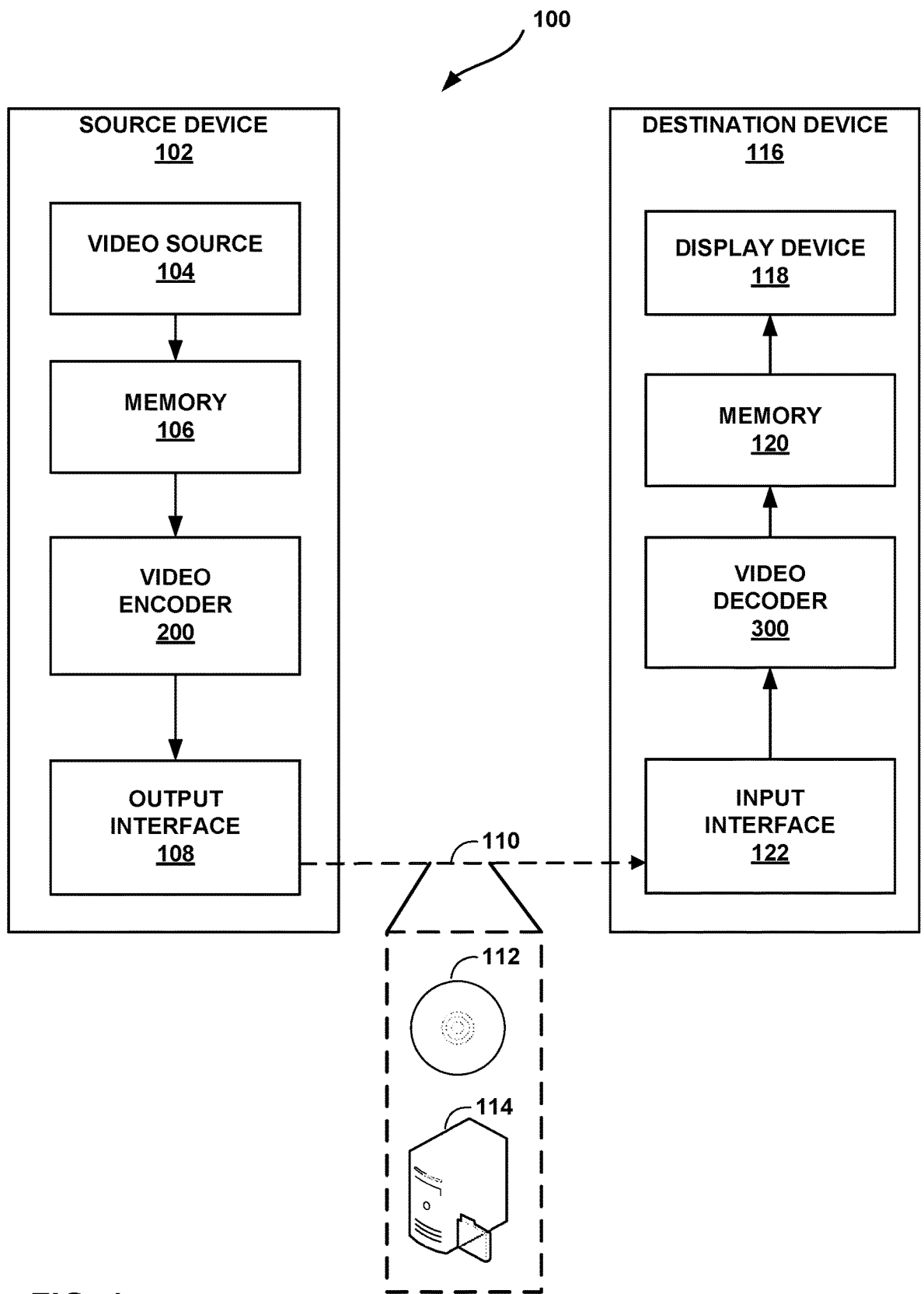
FIG. 1 is a block diagram illustrating an example video encoding and decoding system that may perform the techniques of this disclosure.

This disclosure describes techniques for improving an accuracy of video coding when a current picture and reference picture have different sizes and/or when using sub-pictures. In Bross, et al. "Versatile Video Coding (Draft 7)," Joint Video Experts Team (WET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"), techniques are described which allow prediction of a current picture using a reference picture having a different number of samples (e.g., resolution) than the current picture. That is, rather than using an I-frame that does not use other frames for prediction, a video coder (e.g., a video encoder or a video decoder) may use a prediction frame (e.g., P-frame) or B-frame (bi-predicted frame) when changing a resolution. Using a P-frame or B-frame may potentially reduce an amount of video data signal compared to using an I-frame.

In video coding, a current block in a current picture may have a motion vector that indicates a location in a reference picture that is outside a picture boundary of the reference picture. Such a situation may arise in various circumstances, such as when merge mode is used to determine the motion vector of the current block and the current block inherits a motion vector from a neighboring block of the current picture. In this case, the motion vector of the neighboring block may indicate a location that is within the picture boundary of the reference picture. However, when the neighboring block's motion vector is taken to start from the current block, the resulting motion vector may indicate a location outside the picture boundary of the reference picture. As such, a video coder (e.g., a video encoder or a video decoder) may perform reference sample clipping (which may also be referred to herein as "padding reference samples") to generate reference samples. In some cases, the term "clipping" refers to rounding, that is, reducing the bit depth of a value. However, in this disclosure, the term clipping is generally used to refer to a process where a video coder substitutes a sample value for a first sample (e.g., an unavailable pixel) with a second sample value for a second sample (e.g., an available sample) using positions of the first sample and the second sample. That is, the term "clipping" in this disclosure may generally refer to a rounding of a position for a sample rather than a rounding of a bit depth value. For example, the video coder may use the closest sample values that are within the picture boundary of the reference picture. For instance, each sample above a sample immediately within the picture boundary may be assumed to have the value of the sample within the picture boundary. A similar principle may be applied for samples left, right, and below the picture boundary of the reference picture.

One or more problems may occur when performing reference sample clipping using a reference picture with a different size than a current picture. For example, when generating a prediction block for a current picture using a reference picture having a different number of samples (e.g., resolution) than the current picture, a video coder (e.g., a video encoder or a video decoder) may apply a picture boundary of the reference picture that may reduce a coding accuracy. For example, the video coder may perform reference sample clipping on samples within a size of the reference picture when the picture boundary is generated using a current picture size that has fewer samples than the reference picture. In another example, the video coder may not perform reference sample clipping on samples outside of a size of the reference picture (e.g., unavailable reference samples) when the picture boundary is generated using a current picture size that has more samples than the reference picture.

This disclosure describes example techniques that may represent one or more solutions to the above identified problems and/or one or more other problems. For example, when performing reference sample clipping on the reference block, a video coder (e.g., a video encoder or a video decoder) may perform reference sample clipping using a size of the reference picture instead of a current picture size. For instance, a particular edge reference sample may be arranged at a rightmost position of the size of the reference picture (e.g., picW−1). In this instance, the video coder may set a position for all samples to the right of the particular edge reference sample to correspond to the particular edge reference sample. In this way, the video coder may "clip" the reference sample position to be within the size of the reference picture. Said differently, the video coder may "pad" the reference samples positioned to the right of the particular edge reference sample (e.g., outside of the size of the reference picture) with the particular edge reference sample value. Performing reference sample clipping using a size of the reference picture may increase a coding accuracy of the video coder compared to techniques that perform reference sample clipping using the current picture size.

In some examples, a video coder (e.g., a video encoder or a video decoder) may perform wraparound processing to generate a set of reference samples. Wraparound processing, which may also be referred to herein as "wraparound motion compensation," may be utilized in coding omni-directional video content (also referred to as 360° video content). Wraparound processing may use video content wrapping around in 360° video content for purposes of inter-prediction. For example, a video coder (e.g., video encoder or video decoder) may generate a prediction block for inter-predicting a current block based on samples along opposite boundaries of a reference picture. For instance, the prediction block may include samples from a portion in the reference picture that extends beyond the left boundary of the reference picture and wraps back to the right boundary of the reference picture. In this example, the prediction block includes samples near the left boundary of the reference picture and samples from near the right boundary of the reference picture.

One or more problems may occur when performing wraparound processing using a reference picture with a different size than a current picture. For example, when generating a prediction block for a current picture using a reference picture having a different number of samples (e.g., resolution) than the current picture, a video coder (e.g., a video encoder or a video decoder) may apply a picture boundary of the reference picture that may reduce a coding accuracy. For example, the video coder may perform wraparound processing on samples within a size of the reference picture when the picture boundary is generated using a current picture size that has fewer samples than the reference picture. In another example, the video coder may not perform wraparound processing on samples outside of a size of the reference picture (e.g., unavailable reference samples) when the picture boundary is generated using a current picture size that has more samples than the reference picture.

This disclosure describes example techniques that may represent one or more solutions to the above identified problems and/or one or more other problems. For example, when performing wraparound processing on the reference block, a video coder (e.g., a video encoder or a video decoder) may perform wraparound processing based on a size of the reference picture instead of a current picture size. For example, the video coder may generate a sample of the one or more set of reference samples based on the size of the reference picture and a wraparound offset. In this way, the prediction block may be generated using reference samples from a portion in the reference picture that, for example, extends beyond the left boundary of the size of the reference picture and wraps back to the right boundary of the size of the reference picture. Performing wraparound processing using a size of the reference picture may increase a coding accuracy of the video coder compared to techniques that perform reference wraparound processing using the current picture size.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for using one or more boundaries of a reference sub-picture to generate prediction information. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for using one or more boundaries of a reference sub-picture to generate prediction information. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A draft of the VVC standard is described in Bross, et al. "Versatile Video Coding (Draft 7)," Joint Video Experts Team (WET) of ITU-T SG 16 WP 3 and ISO/IEC JTC 1/SC 29/WG 11, $16^{th}$ Meeting: Geneva, CH, 1-11 Oct. 2019, WET-P2001-v14 (hereinafter "VVC Draft 7"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

In accordance with the techniques of the disclosure, video encoder 200 may generating a set of reference samples for the current block of the current picture based on a size of the reference picture. For example, video encoder 200 may perform reference sample clipping on a reference block of a reference picture based on the size of the reference picture. In some examples, video encoder 200 may perform a wraparound process based on the size of the reference picture. For instance, video encoder 200 may generate a sample of the one or more set of reference samples based on the size of the reference picture and a wraparound offset. In this way, a coding accuracy of video encoder 200 may be improved compared to systems that may perform reference sample clipping on a reference block of a reference picture based on a current picture size and/or perform a wraparound process based on the current picture size.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

In accordance with the techniques of the disclosure, video decoder 300 may generate a set of reference samples for the current block of the current picture based on a size of the reference picture. For example, video decoder 300 may perform reference sample clipping on a reference block of a reference picture based on the size of the reference picture. In some examples, video decoder 300 may perform a wraparound process based on the size of the reference picture. For instance, video decoder 300 may generate a sample of the one or more set of reference samples based on the size of the reference picture and a wraparound offset. In this way, a coding accuracy of video decoder 300 may be improved compared to systems that may perform reference sample clipping on a reference block of a reference picture based on a current picture size and/or perform a wraparound process based on the current picture size.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and/or video decoder 300 may be configured to perform the method comprising determining a reference block of a reference picture for prediction of a current block of a current picture using motion information and generating a set of reference samples for the current block of the current picture, wherein generating the set of reference samples comprises performing reference sample clipping on the reference block of the reference picture based on a size of the reference picture. The method further includes generating a prediction block for the current block of the current picture based on the set of reference samples.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
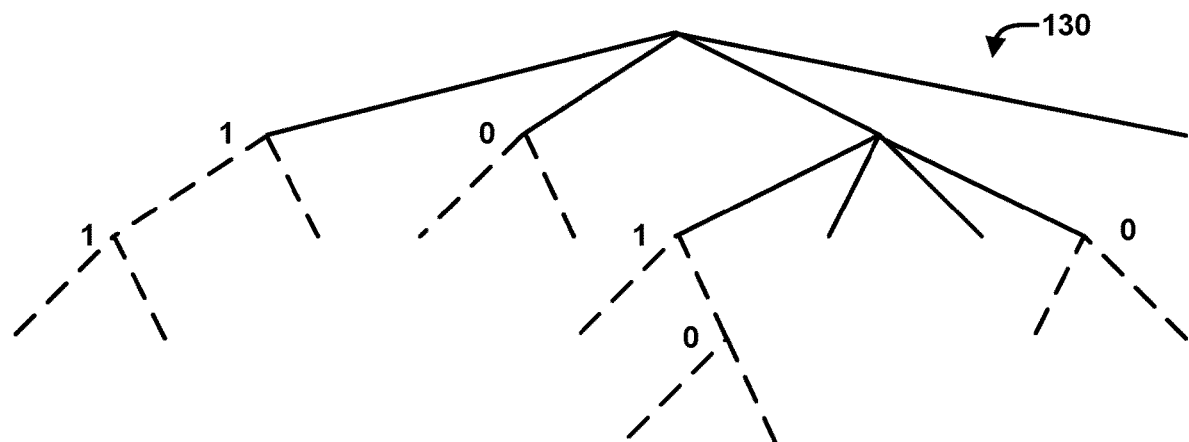
FIGS. 2A and 2B are conceptual diagrams illustrating an example quadtree binary tree (QTBT) structure, and a corresponding coding tree unit (CTU).
Figure 2B:
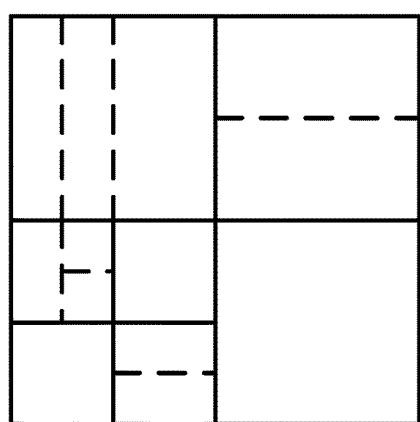

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, it will not be further split by the binary tree, since the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs and are further processed according to prediction and transform without further partitioning.

Figure 3:
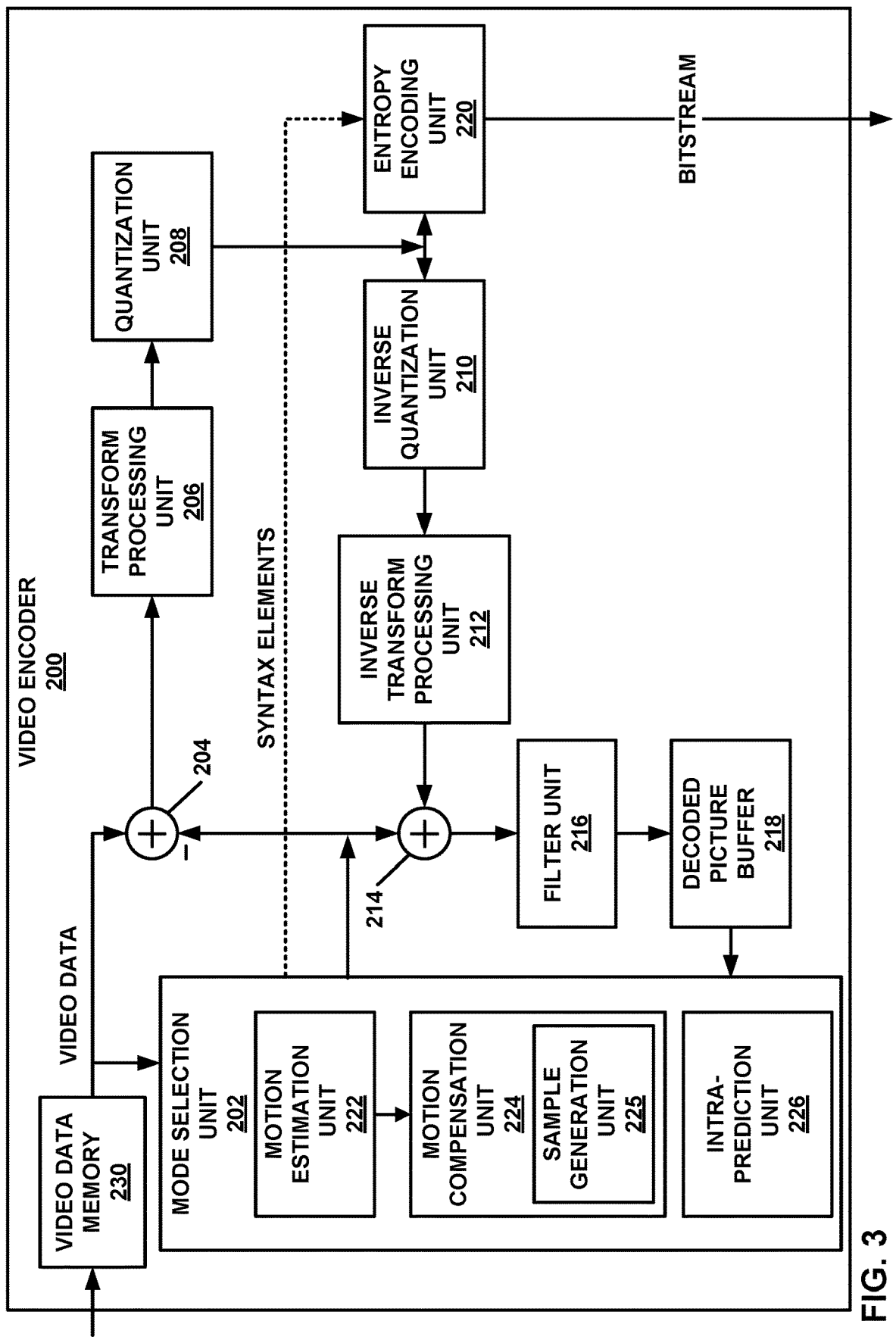
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

In accordance with the techniques of the disclosure, mode compensation unit 224 may include a sample generation unit 225. Sample generation unit 225 may generate a set of reference samples for the current block of the current picture based on a size of the reference picture. For example, sample generation unit 225 may perform reference sample clipping on a reference block of a reference picture based on the size of the reference picture. In some examples, sample generation unit 225 may perform a wraparound process based on the size of the reference picture. For instance, sample generation unit 225 may generate a sample of the one or more set of reference samples based on the size of the reference picture and a wraparound offset. In this way, a coding accuracy of video encoder 200 may be improved compared to systems that may perform reference sample clipping on a reference block of a reference picture based on a current picture size and/or perform a wraparound process based on the current picture size.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to: determine a reference block of a reference picture for prediction of a current block of a current picture using motion information and generate a set of reference samples for the current block of the current picture, wherein generating the set of reference samples comprises performing reference sample clipping on the reference block of the reference picture based on a size of the reference picture. The one or more processing units may be further configured to generate a prediction block for the current block of the current picture based on the set of reference samples.

Figure 4:
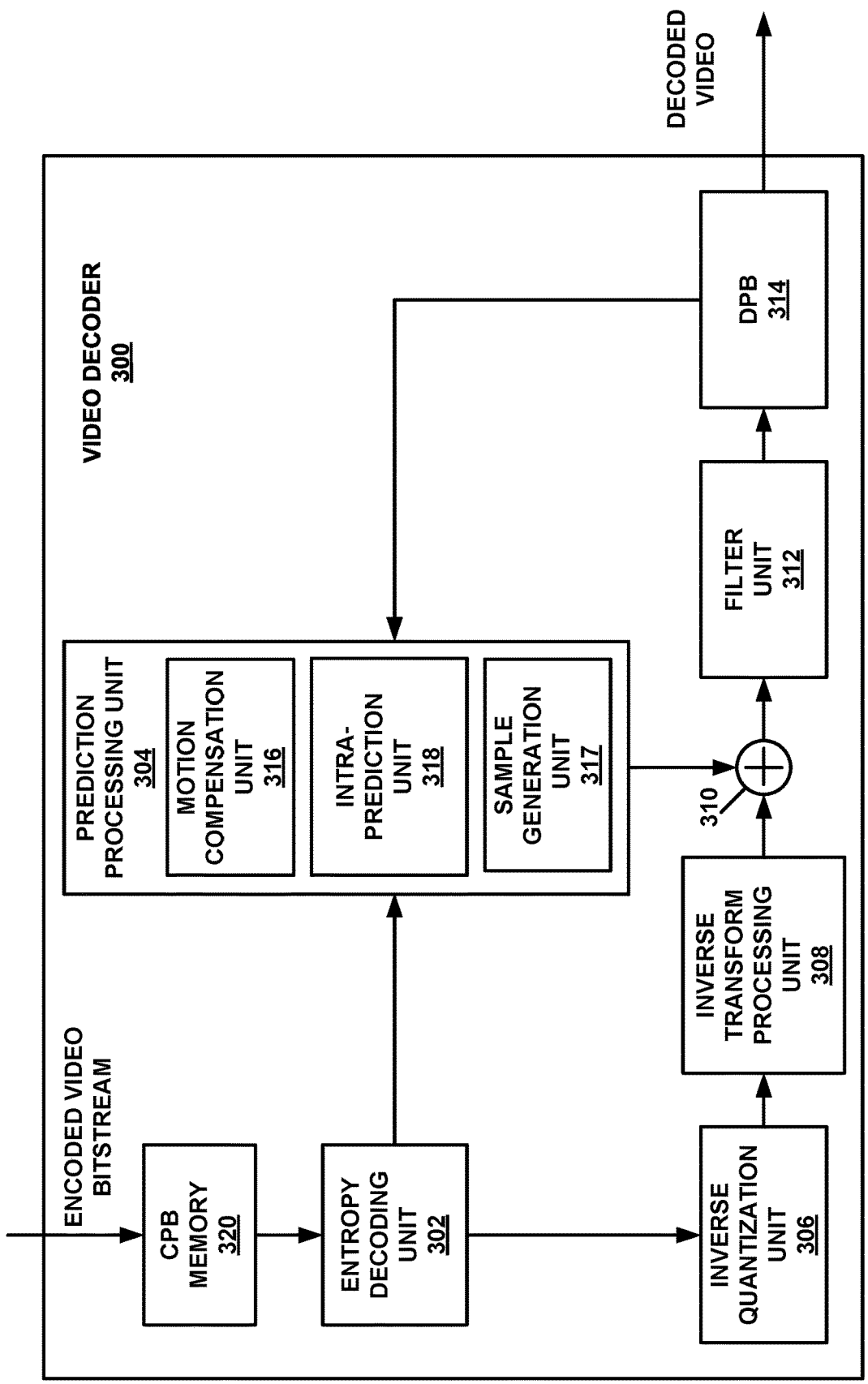
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

In accordance with the techniques of the disclosure, motion compensation unit 316 may include a sample generation unit 317. Sample generation unit 317 may generate a set of reference samples for the current block of the current picture based on a size of the reference picture. For example, sample generation unit 317 may perform reference sample clipping on a reference block of a reference picture based on the size of the reference picture. In some examples, sample generation unit 317 may perform a wraparound process based on the size of the reference picture. For instance, sample generation unit 317 may generate a sample of the one or more set of reference samples based on the size of the reference picture and a wraparound offset. In this way, a coding accuracy of video decoder 300 may be improved compared to systems that may perform reference sample clipping on a reference block of a reference picture based on a current picture size and/or perform a wraparound process based on the current picture size.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to: determine a reference block of a reference picture for prediction of a current block of a current picture using motion information and generate a set of reference samples for the current block of the current picture, wherein generating the set of reference samples comprises performing reference sample clipping on the reference block of the reference picture based on a size of the reference picture. The one or more processing units may be further configured to generate a prediction block for the current block of the current picture based on the set of reference samples.

In VVC draft 7, a picture can be partitioned in one or more sub-pictures. A sub-picture can be treated as a picture by setting a flag subpic_treated_as_pic_flag[i] equal to 1. In this case, sub-picture can be decoded as a separate picture, e.g. being extracted. For example, a video coder (e.g., video encoder 200 or video decoder 300) may be configured to partition a single picture into a plurality of sub-pictures. In this example, the video coder may code (e.g., encode or decode) a sub-picture of the plurality of sub-pictures as a picture when a flag subpic_treated_as_pic_flag[i] equal to 1. The video coder may decode the sub-picture as a separate picture from other sub-pictures of the plurality of sub-pictures.

In some examples, a number of sub-pictures in a picture may remain the same (e.g., constant) while a video coder (e.g., video encoder 200 or video decoder 300) may be configured to reorder the sub-picture in the picture. In some examples, sub-picture reordering may be per picture. For instance, the video coder may be configured to reorder sub-pictures within a first picture using a first order and reorder sub-pictures within a second picture in a second order that is different from the first order. In some instances, the video coder may be configured to reorder sub-pictures within a first picture using a first order and refrain from reordering sub-pictures within a second picture. As such, when the video coder reorders sub-pictures, the decoding results of the reordered sub-pictures may be different when the sub-picture is decoded as a part of the whole picture or as a separate picture.

Techniques described herein may help to fix the decoding problem of the reordered sub-pictures by considering boundaries of a reference sub-picture in the motion compensation process and temporal motion vector prediction (TMVP) derivation. Additionally, techniques described herein may be used to replace a current picture size with a size of the reference picture in the clipping (e.g., motion padding) because the reference picture may have a different size than the current picture when reference picture resampling is enabled.

When using techniques described in VVC draft 7, a video coder (video encoder 200 or video decoder 300) may partition (or determine a partitioning of) a picture in one or more sub-pictures. A video encoder (e.g., video encoder 200) may be configured to signal the sub-picture partitioning layout in SPS. The video encoder may be configured to signal the picture sub-picture layout mapping to SPS layout in PPS or a picture header (PH). The video encoder may be configured to signal slices with a slice_subpic_id signaled in a slice header (SH) to identify which sub-picture the slices belong to.

When using techniques described in VVC draft 7, a video encoder (video encoder 200) may treat a sub-picture as a picture by setting a flag subpic_treated_as_pic_flag[i] equal to 1. In this case, a video decoder (e.g., video decoder 300) may decode a sub-picture as a separate picture, e.g. being extracted.

A number of sub-pictures in a picture may remain the same (e.g., constant) while a video coder (e.g., video encoder 200 or video decoder 300) reorders the sub-picture in the picture. In some examples, the video coder may perform sub-picture reordering per picture. For instance, the video coder may be configured to reorder sub-pictures within a first picture using a first order and reorder sub-pictures within a second picture in a second order that is different from the first order. In some instances, the video coder may be configured to reorder sub-pictures within a first picture using a first order and refrain from reordering sub-pictures within a second picture. As such, when the video coder reorders sub-pictures, the decoding results of the reordered sub-pictures may be different when the sub-picture is decoded as a part of the whole picture or as a separate picture.

Figure 5:
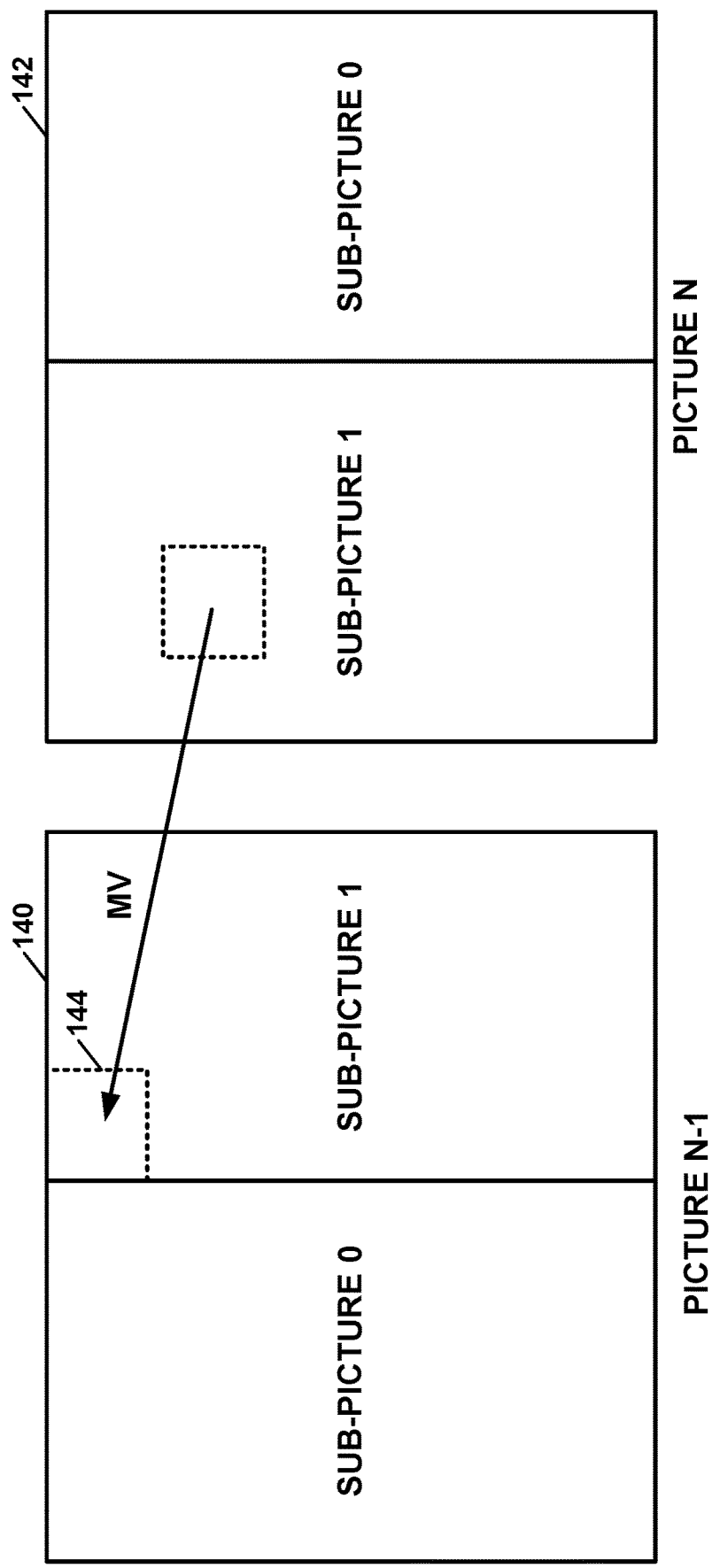
FIG. 5 is a conceptual diagram illustrating a reordering of sub-pictures
Figure 6:
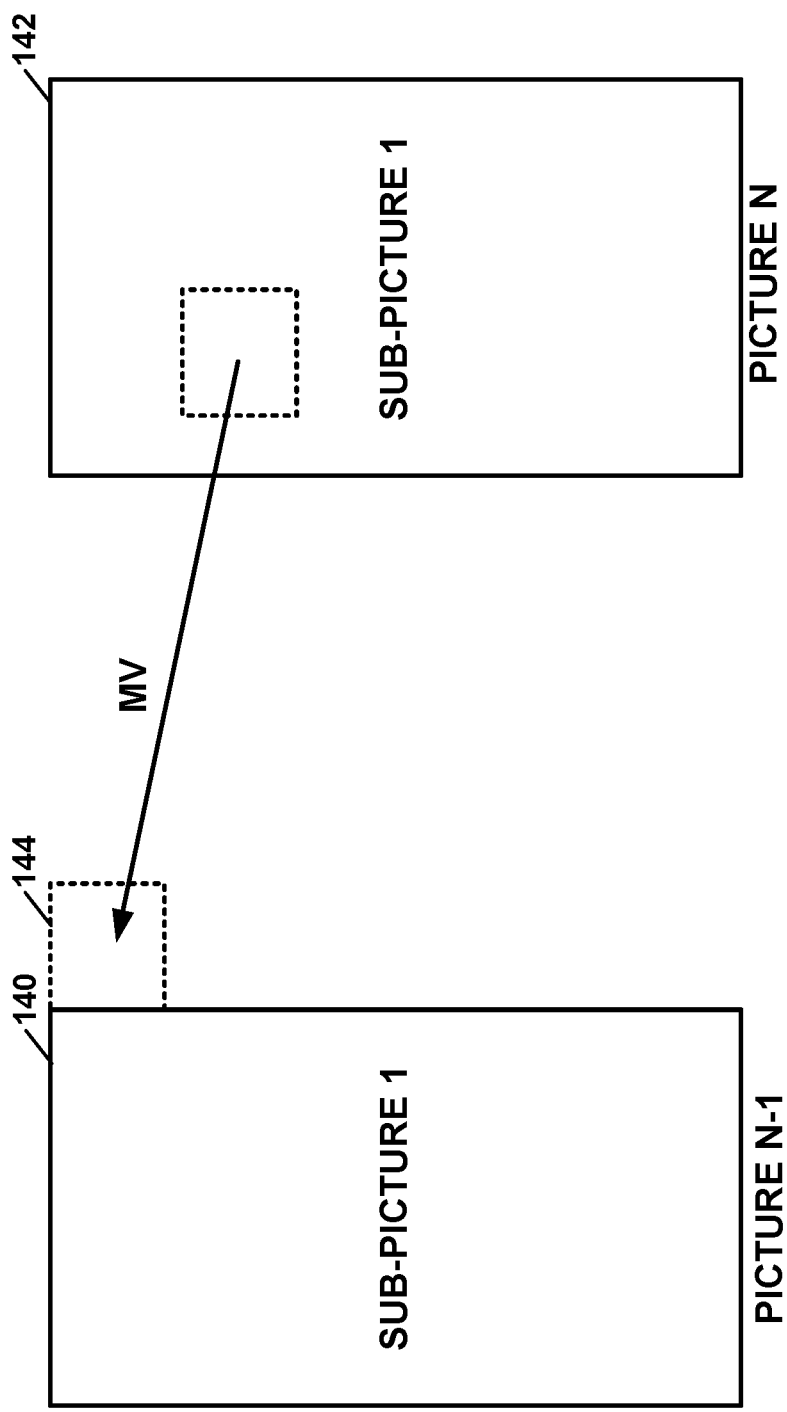
FIG. 6 is a conceptual diagram illustrating an extracted sub-picture after sub-picture reordering.

An example of this case, where MV points to difference reference blocks, is shown on the FIG. 5 (sub-picture is decoded as a part of the entire picture) and in FIG. 6 (the only extracted sub-picture is decoded). In the example of FIG. 5, a reference picture 140 (e.g., picture N−1) includes a sub-picture 0 ordered before sub-picture 1 (e.g., sub-picture 0 is left of sub-picture 1). As shown, a reference block 144 of reference picture 140 is positioned in sub-picture 1 of reference picture 140. However, a current picture 142 (e.g., picture N) includes a sub-picture 0 ordered after sub-picture 1 (e.g., sub-picture 0 is right of sub-picture 1). As described below, the reordering of sub-picture 0 ordered after sub-picture 1 may result in reference block 144 of reference picture 140 being positioned outside of sub-picture 1 of reference picture 140.

A video coder (e.g., video encoder 200 or video decoder 300) may be configured to use a current picture size in the reference sample clipping (e.g., padding) process, for example, using the following equations.

The variable picW is set equal to pic_width_in_luma_samples and the variable picH is set equal to pic_height_in_luma_samples.

$$xInt_i = Clip3(0, picW-1, sps\_ref\_wraparound\_enabled\_flag\ ?$$

$$ClipH((sps\_ref\_wraparound\_offset\_minus1+1) * MinCbSizeY, picW, xInt_L+i-3) : xInt_L+i-3) \quad (957)$$

$$yInt_i = Clip3(0, picH-1, yInt_L+i-3) \quad (958)$$

Where $$Clip3(x, y, z) = \begin{cases} x; & z < x \\ y; & x > y \\ z; & \text{otherwise} \end{cases}$$

$$ClipH(o, W, x) = \begin{cases} x + o; & x < 0 \\ x - o; & x > W - 1 \\ x; & \text{otherwise} \end{cases}$$

and where sps_ref_wraparound_enabled_flag is a flag indicating whether a wraparound process is enabled, MinCbSizeY is a minimum coding block size along a vertical direction, picW is a width in samples of a current picture, $xInt_L$ is a luma location in a horizontal direction, picH is a height in samples of a current picture, and $yInt_L$ is a luma location in a vertical direction.

A video coder (e.g., video encoder 200 or video decoder 300) may be configured to clip the reference sample coordinates by the current picture width and height, while the video coder should instead use the reference picture width and height as the current picture width and height and the reference picture width and height may be different when reference picture resampling is used.

When using techniques described in VVC draft 7, a video encoder (video encoder 200) may partition a picture into one or more sub-pictures. Video encoder 200 may signal the sub-picture partitioning layout signaled in a SPS. Video encoder 200 may signal the picture sub-picture layout mapping to SPS layout in a PPS or a picture header (PH). Video encoder 200 may signal slice_subpic_id in a slice header (SH) to identify which sub-picture a slice belongs to.

| SPS: | |
|---|---|
| ... | |
| ref_pic_resampling_enabled_flag | u(1) |
| pic_width_max_in_luma_samples | ue(v) |
| pic_height_max_in_luma_samples | ue(v) |
| sps_log2_ctu_size_minus5 | u(2) |
| subpics_present_flag | u(1) |
| if( subpics_present_flag ) { | |
|   sps_num_subpics_minus1 | u(8) |
|   for( i = 0; i <= sps_num_subpics_minus1;i++ ) { | |
|     subpic_ctu_top_left_x[ i ] | u(v) |
|     subpic_ctu_top_left_y[ i ] | u(v) |
|     subpic_width_minus1[ i ] | u(v) |
|     subpic_height_minus1[ i ] | u(v) |
|     subpic_treated_as_pic_flag[ i ] | u(1) |
|     loop_filter_across_subpic_enabled_flag[ i ] | u(1) |
|   } | |
| } | |
| sps_subpic_id_present_flag | |
| if( sps_subpic_id_present_flag ) { | |
|   sps_subpic_id_signalling_present_flag | u(1) |
|   if( sps_subpics_id_signalling_present_flag ) { | |
|     sps_subpic_id_len_minus1 | ue(v) |
|     for( i = 0; i <= sps_num_subpics_minus1; i++ ) | |
|       sps_subpic_id[ i ] | u(v) |
|   } | |
| } | |
| ... | |

| PPS: | |
|---|---|
| pic_parameter_set_rbsp( ) { | Descriptor |
|   pps_pic_parameter_set_id | ue(v) |
|   pps_seq_parameter_set_id | .(4) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   scaling_window_flag | u(1) |
|   if( scaling_window_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   pps_subpic_id_signalling_present_flag | u(1) |
|   if( pps_subpics_id_signalling_present_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |

| PH: | |
|---|---|
| ... | |
| if( sps_subpic_id_present_flag && | |
| !sps_subpic_id_signalling_flag ) { | |
|   ph_subpic_id_signalling_present_flag | u(1) |
|   if( ph_subpics_id_signalling_present_flag ) { | |
|     ph_subpic_id_len_minus1 | ue(v) |
|     for( i = 0; i <= sps_num_subpics_minus1; i++ ) | |
|       ph_subpic_id[ i ] | u(v) |
|   } | |
| } | |

| SH: | |
|---|---|
| ... | |
| if( subpics_present_flag ) | |
|   slice_subpic_id | u(v) |
| ... | |

A video coder (e.g., video encoder 200 or video decoder 300) may be configured to derive the sub-pictures mapping to SPS layout by SubpicIdList[i] list for i-th sub-picture as follows:

```
for( i = 0; i <= sps_num_subpics_minus1; i++ )
SubpicIdList[ i ] = sps_subpic_id_present_flag ?(76)
( sps_subpic_id_signalling_present_flag ? sps_subpic_id[ i ]:
( ph_subpic_id_signalling present_flag ? ph_subpic_id[ i ] :
pps_subpic_id[ i ] ) ) : i
```

A video coder (video encoder 200 or video decoder 300) may treat (e.g., encode or decode) sub-pictures as a picture when subpic_treated_as_pic_flag[SubPicIdx] is equal to 1. In some examples, video encoder 200 may signal the subpic_treated_as_pic_flag[SubPicIdx] flag per subpicture with sub-picture index SubPicIdx. In this example, the video coder may extract the sub-picture into a separate bitstream and a video decoder (e.g., video decoder 200) may decode the sub-picture as a separate picture. In this example, the video decoder may performing identical techniques whether the sub-picture is decoded as a picture or as a part of larger picture with other sub-pictures.

> subpic_treated_as_pic_flag[i] equal to 1 specify that the i-th subpicture of each coded picture in the coded layer video sequence (CLVS) is treated as a picture in the decoding process excluding in-loop filtering operations.
>
> subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to 0.

A video coder (e.g., video encoder 200 or video decoder 300) may derive sub-picture boundaries from the signaled layout as left, top, right, and bottom boundary positions.

A video coder (e.g., video encoder 200 or video decoder 300) may derive the variables SubPicLeftBoundaryPos, SubPicTopBoundaryPos, SubPicRightBoundaryPos, and SubPicBotBoundaryPos as follows:

```
if( subpic_treated_as_pic_flag[ SubPicIdx ] ) {
  SubPicLeftBoundaryPos =
subpic_ctu_top_left_x[ SubPicIdx ] * CtbSizeY
  SubPicRightBoundaryPos =
Min( pic_width_max_in_luma_samples1,
  ( subpic_ctu_top_left_x[ SubPicIdx ] + subpic_width_minus1[ SubPicId
x ] + 1 ) * CtbSizeY − 1)
  SubPicTopBoundaryPos =
subpic_ctu_top_left_y[ SubPicIdx ] *CtbSizeY(116)
  SubPicBotBoundaryPos = Min( pic_height_max_in_luma_samples − 1,
  ( subpic_ctu_top_left_y[ SubPicIdx ] + subpic_height_minus1[ SubPicI
dx ] + 1 ) * CtbSizeY − 1)
```

RefSubPicLeftBoundaryPos is a left boundary of the one or more reference picture boundaries, RefSubPicRightBoundaryPos is a right boundary of the one or more reference picture boundaries, RefSubPicTopBoundaryPos is a top boundary of the one or more reference picture boundaries, RefSubPicBotBoundaryPos is a bottom boundary of the one or more reference picture boundaries, subpic_ctu_top_left_x[RefSubPicIdx] is a top left corner of the reference picture, CtbSizeY is a height of a coding tree block for the video data, CtbSizeY is a height of a coding tree block for the video data, picW is a width of the picture, subpic_width_minus1[RefSubPicIdx] is a width of the sub-picture minus 1, CtbSize is a size of the coding tree block, PicH is a height of the picture, subpic_height_minus1[RefSubPicIdx] is a height of the sub-picture minus 1.

In the decoding process, a video coder (e.g., video encoder 200 or video decoder 300) may be configured to clip a reference sample to a sub-picture boundary when the sub-picture is treated (e.g., encoded or decoded) as a picture. For example, during motion compensation interpolation process, the video coder may clip an integer sample position to the sub-picture boundaries.

A video coder (e.g., video encoder 200 or video decoder 300) may be configured to derive the luma locations in full-sample units ($xInt_i$, $yInt_i$) as follows for i=0 . . . 1:

If subpic_treated_as_pic_flag[SubPicIdx] is equal to 1, the following equation, which is referred to herein as "equation (644)," applies:

$$xInt_i = Clip3(SubPicLeftBoundaryPos, SubPicRightBoundaryPos, xInt_L+i) \quad (642)$$

$$yInt_i = Clip3(SubPicTopBoundaryPos, SubPicBotBoundaryPos, yInt_L+i) \quad (643)$$

Otherwise (subpic_treated_as_pic_flag[SubPicIdx] is equal to 0), the following applies:

$$xInt_i = Clip3(0, picW-1, sps\_ref\_wraparound\_enabled\_flag?$$

$$ClipH((sps\_ref\_wraparound\_offset\_minus1+1)$$
$$*MinCbSizeY, pic\ W, (xInt_L+i)):xInt_L+i) \quad (644)$$

$$yInt_i = Clip3(0, picH-1, yInt_L+i) \quad (645)$$

$$clip3 \text{ is a function } Clip3(x, y, z) = \begin{cases} x; & z < x \\ y; & z > y \\ z; & \text{otherwise} \end{cases}$$

($xInt_i$, $yInt_i$) are luma locations in full-sample units, RefSubPicLeftBoundaryPos is a left boundary of the one or more reference picture boundaries, RefSubPicRightBoundaryPos is a right boundary of the one or more reference picture boundaries, RefSubPicTopBoundaryPos is a top boundary of the one or more reference picture boundaries, RefSubPicBotBoundaryPos is a bottom boundary of the one or more reference picture boundaries.

FIG. 5 is a conceptual diagram illustrating a reordering of sub-pictures. Video encoder 200 may signal sub-pictures mapping in PPS, PH or SPS. In some examples, sub-picture IDs can be changed from picture to picture as shown on FIG. 5.

In the example of FIG. 5, in SPS layout, video encoder 200 may be configured to signal two sub-pictures 0 and 1. In PPS or PH, a video coder (e.g., video encoder 200 or video decoder 300) may be configured to reorder the sub-pictures. For example, the video coder may be configured to reorder the sub-pictures such that the SPS sub-picture index 0 may correspond the sub-picture with id 0 in previous picture 140 and may correspond sub-picture id 1 in current picture 142 as also shown on FIG. 5.

When sub-picture is treated as a picture, the sub-picture may be decoded separately as other sub-pictures would not exist. For example, in the decoding of sub-picture 1 of current picture 142 as a part of larger picture, a video coder (e.g., video encoder 200 or video decoder 300) may determine that a motion vector points out to a reference block with the top left corner coordinates (sub_pic0_width, 0), while in the extracted sub-picture 1, the motion vector still points to (sub_pic0_width, 0) which corresponds to different reference samples.

Said differently, for example, when a video coder (e.g., video encoder 200 or video decoder 300) codes (e.g., encodes or decodes) a sub-picture as a picture, the video coder may code the sub-picture separately as if other sub-pictures would not exist. For example, when coding sub-picture 1 as part of a larger picture, the video coder may generate a motion vector that points out to a reference block with the top left corner coordinates (sub_pic0_width, 0). In this example, when coding sub-picture 1 as part an extracted sub-picture 1, the video coder may generate a motion vector that still points out to (sub_pic0_width, 0), which corresponds to different reference samples that when the video coder decoded sub-picture 1 as part of a larger picture.

For consistent prediction, the motion vector should point to (0, 0) as shown in FIG. 6. In such cases, the coding of a sub-picture 1 of current picture 142 as a part of a larger picture or separately does not provide the identical output. Said differently, for example, when coding a sub-picture as a picture and when coding a sub-picture as part of a larger picture, a video coder (e.g., video encoder 200 or video decoder 300) may be configured to generate a motion vector that points to (0, 0) (e.g., the upper left corner of sub-picture 0 of picture N–1 shown on FIG. 6 instead of (sub_pic0_width, 0) (e.g., the location the MV points to in FIG. 6).

FIG. 6 is a conceptual diagram illustrating an extracted sub-picture after sub-picture reordering.

Another problem is that in the decoding process, when a sub-picture is not treated as a picture, the sample is clipped to the current picture boundaries using picW–1, or picH–1 (where PicW corresponds to a current picture width and PicH corresponds to a current picture height) or motion wraparound is applied considering the current picture size, as for example expressed in the equation (644). Said differently, for example, a video coder (e.g., video encoder 200 or video decoder 300) may be configured to clip the reference picture boundaries using picW–1 (e.g., a width of Picture N) and/or picH–1 (e.g., a height of Picture N). In some examples, the video coder may be configured to apply motion wraparound considering the current picture size. For instance, to apply motion wraparound considering the current picture size, the video coder may be configured apply equation (644).

However, a size of the reference picture may be different from the current picture size when the reference picture resampling is enabled. In this case, using the current picture boundaries in the decoding process may provide wrong results, especially for the case when a reference picture is smaller than the current picture. Said differently, for example, a video coder (e.g., video encoder 200 or video decoder 300) using the current picture boundaries in the decoding process may provide wrong results when a reference picture is smaller than the current picture.

Techniques described herein may address the aforementioned problems described herein and/or one or more other problems. The techniques described herein may be used independently or in any combination. Techniques described herein may be applied to all sub-pictures, alternatively the described methods may be applied only to sub-pictures which are treated as pictures, for example when subpic_treated_as_pic_flag[SubPicIdx] is equal to 1 for those sub-pictures with sub-picture index SubPicIdx.

To help to mitigate or solve sub-picture reordering problems and/or other problems, techniques described here introduce a reference sub-picture left, top, right, and bottom boundaries of a reference picture. A video coder (e.g., video encoder 200 or video decoder 300) may be configured to derive these reference sub-picture boundaries from the sub-picture mapping specified for the reference picture, for example signaled in PPS or PH for the reference picture.

To identify the sub-picture, a video coder (e.g., video encoder 200 or video decoder 300) may be configured to use the slice_subpic_id of the current picture in the mapping process to derive the reference sub-picture index RefSubPicIdx of the SPS layout. For instance, the video coder may be configured to partition a picture into a plurality of sub-pictures based on a sub-picture mapping specified for the picture and identify a sub-picture of the plurality of sub-pictures for a block of video data based on a sub-picture identifier. The video coder may be configured to determine a sub-picture identifier for a sub-picture of the plurality of sub-pictures containing a block of the video data. In some examples, the block of the video data includes (or is) a slice of the video data. In some examples, the block of the video data is included in a slice of the video data.

In some examples, a video coder (e.g., video encoder 200 or video decoder 300) may be configured to derive the reference sub-picture boundaries from the sub-picture layout as follows:

RefSubPicIdx is derived to be such that SubpicIdList [RefSubPicIdx] of the reference picture is equal to slice_subpic_id.

That is, the video coder may be configured to derive a reference sub-picture index for the sub-picture based on the sub-picture identifier.

A video coder (e.g., video encoder 200 or video decoder 300) may be configured to derive one or more reference picture boundaries of a reference picture based on the sub-picture identifier. For example, the video coder may be configured to derive the variables RefSubPicLeftBoundaryPos, RefSubPicTopBoundaryPos, RefSubPicRightBoundaryPos, and RefSubPicBotBoundaryPos as follows:

RefSubPicLeftBoundaryPos=subpic_ctu_top_left_x [RefSubPicIdx]*CtbSizeY

RefSubPicRightBoundaryPos=Min(picW–1,(subpic_ctu_top_left_x[RefSubPicIdx]+subpic_width_minus1[RefSubPicId x]+1)*CtbSizeY–1)

RefSubPicTopBoundaryPos=subpic_ctu_top_left_y [RefSubPicIdx]*CtbSize

RefSubPicBotBoundaryPos=Min(picH–1,(subpic_ctu_top_left_y[RefSubPicIdx]+subpic_height_minus1[RefSubPicId x]+1)*CtbSizeY–1)

A video coder (e.g., video encoder 200 or video decoder 300) may be configured to perform the reference sample clipping using the reference sub-picture position instead for the current sub-picture position. That is, the video coder may be configured to perform reference sample clipping on the block of the video data based on the one or more reference picture boundaries of the reference picture to generate a set of reference samples for the block of the video data. In some examples, the video coder may be configured to generate prediction information for the block of the video data based on the set of reference samples for the block of the video data.

An example is shown modifying the clipping process in the equations (642) and (643) as follows. Said differently, for example, a video coder (e.g., video encoder 200 or video decoder 300) may be configured to modify a clipping process in equations (642) and/or (643) as follows.

$xInt_i=Clip3(RefSubPicLeftBoundaryPos, RefSubPicRightBoundaryPos, xInt_L+i)$ (642)

$$yInt_i = Clip3(RefSubPicTopBoundaryPos, RefSubPicBotBoundaryPos, yInt_L+i) \quad (643)$$

A video coder (e.g., video encoder 200 or video decoder 300) may use sub-pictures boundaries of both the current sub-picture and the reference sub-picture to derive the displacement offset in the motion compensation to take the reference sample from the correct position. Said differently, for example, the video coder may be configured to use sub-pictures boundaries of both the current sub-picture and the reference sub-picture to derive the displacement offset in the motion compensation to take the reference sample from the correct position.

In some examples, the video coder may change a MV. However, because the motion vector may be already encoded in a bitstream and may be used as MV predictor, this example may use re-encoding, which is undesirable for sub-picture extraction or decoding as a separate picture.

The general formula for the displacement calculation can be expressed by considering the difference between the current and reference sub-picture boundary positions, for example as follows. Said differently, for example, a video coder (e.g., video encoder 200 or video decoder 300) may be configured to calculate a displacement considering the difference between the current and reference sub-picture boundary positions as follows.

refPos=curPos−curSubPicBoundaryPos+refSubPicBoundaryPos.

In the detailed example using the left boundary position, the left boundary position can be expressed as follows. Said differently, for example, a video coder (e.g., video encoder 200 or video decoder 300) may be configured to calculate a left boundary position as follows.

refLeftPos=curLeftPos−SubPicLeftBoundaryPos+RefSubPicLeftBoundaryPos.

In the above example, refPos and curPos is the sample positions of the sample in the current sub-picture and a reference sample pointed by a MV in the reference sub-picture, respectively. curSubPicBoundaryPos is the current sub-picture boundary position, refSubPicBoundaryPos is a reference sub-picture boundary position, in one example it can be left, right, top, or bottom sub-picture boundary.

A video coder (e.g., video encoder 200 or video decoder 300) may be configured to apply similar displacement offset to other sub-picture boundary positions, for example, but not limited to, SubPicTopBoundaryPos and RefSubPicBottomBoundaryPos.

In the motion compensation process, a video coder (e.g., video encoder 200 or video decoder 300) may be configured to add the displacement offset to other existing offsets instead of adding the displacement at the end of the reference sample position derivation. In this example, the accuracy of the computation may be increased compared to systems that add the displacement at the end of the reference sample position derivation because the position derivation may be done with a higher precision, for example MV accuracy may be 1/16 pel (1/16 of integer sample position).

In some examples, a video coder (e.g., video encoder 200 or video decoder 300) may be configured to add the displacement offset to the existing scaling window offsets in the interpolation process. Additions relative to VVC draft 7 in the Example 1 are highlighted with "**". Subtractions relative to VVC draft 7 in the Example 1 are highlighted with "→" and "←"

To help to address the problem of the different size reference picture, a video coder (e.g., video encoder 200 or video decoder 300) may be configured to use the size of the reference picture (e.g., width and/or height) in the reference position clipping and wraparound process instead of the current picture size.

In some examples, a video coder (e.g., video encoder 200 or video decoder 300) may be configured to modify picW and picH to be the reference picture width and reference picture height, respectively. In some examples, the foregoing example may be expressed as follows:

The variable picW is set equal to pic_width_in_luma_samples of the reference picture refPicLX and the variable picH is set equal to pic_height_in_luma_samples of the reference picture refPicLX.

And use the redefined picW and picH in the clipping and wraparound processes, for example as in below. Said differently, for example, a video coder (e.g., video encoder 200 or video decoder 300) may be configured to use a redefined picW and a redefined picH in the clipping and wraparound processes as follows.

Otherwise (subpic_treated_as_pic_flag[SubPicIdx] is equal to 0), the following applies:

$$xInt_i = Clip3(0, picW-1, sps\_ref\_wraparound\_enabled\_flag\ ?$$

$$ClipH((sps\_ref\_wraparound\_offset\_minus1+1) *MinCbSizeY, picW, (xInt_L+i)) : xInt_L+i) \quad (644)$$

$$yInt_i = Clip3(0, picH-1, yInt_L+i) \quad (645)$$

Where $$Clip3(x, y, z) = \begin{cases} x; & z < x \\ y; & z > y \\ z; & \text{otherwise} \end{cases}$$

$$ClipH(o, W, x) = \begin{cases} x+o; & x < 0 \\ x-o; & x > W-1 \\ x; & \text{otherwise} \end{cases}$$

and where sps_ref_wraparound_enabled_flag is a flag indicating whether a wraparound process is enabled, MinCbSizeY is a minimum coding block size along a vertical direction, picW is a width in samples of a reference picture, $xInt_L$ is a luma location in a horizontal direction, picH is a height in samples of the reference picture, and $yInt_L$ is a luma location in a vertical direction.

That is, a video coder (e.g., video encoder 200 or video decoder 300) may generate a set of reference samples for the current block of the current picture based on a size of the reference picture. For example, the video coder may perform reference sample clipping on a reference block of a reference picture based on the size of the reference picture. In some examples, the video coder may perform a wraparound process based on the size of the reference picture. For instance, the video coder may generate a sample of the one or more set of reference samples based on the size of the reference picture and a wraparound offset. In this way, a coding accuracy of the video coder may be improved compared to systems that may perform reference sample clipping on a reference block of a reference picture based on a current picture size and/or perform a wraparound process based on the current picture size.

More specifically, a video coder (e.g., video encoder 200 or video decoder 300) may apply a clipping function (e.g., Clip 3) that limits positions of the reference samples along a horizontal direction of the reference picture to a minimum of 0 and a maximum of a width of the reference picture in samples minus 1 (e.g., picW−1) and along a vertical direction of the reference picture to a minimum of 0 and a maximum of a height of the reference picture in samples minus 1 (e.g., picH−1).

In some examples, the video coder (e.g., video encoder 200 or video decoder 300) may perform wraparound processing based on the size of the reference picture. For example, the video coder may generate a sample of the one or more set of reference samples based on the size of the reference picture and a wraparound offset (e.g., sps_ref_wraparound_offset_minus1). For instance, the video coder may calculate ClipH((sps_ref_wraparound_offset_minus1+1)*MinCbSizeY, picW, (xIntL+i)), where clipH is a function that adds the wraparound offset as modified by the minimum coding block size (e.g., MinCbSizeY) to a luma location (e.g., xIntL).

TMVP Derivation Example

When collocated block position is derived, in one example, a video coder (e.g., video encoder 200 or video decoder 300) may use the collocated block position to derive a temporal motion vector predictor for regular modes such merge or AMVP modes, or for sub-block based temporal MV predictor. The video coder may use reference sub-picture boundaries together with a current sub-picture boundaries to find a correct collocated block position. For example, the video coder may be configured to use reference sub-picture boundaries together with current sub-picture boundaries to determine a correct collocated block position. For instance, when the video coder derives a collocated block position, the video coder may derive a temporal motion vector predictor for regular modes such as, but not limited to, merge or AMVP modes using reference sub-picture boundaries together with current sub-picture boundaries to determine a correct collocated block position. In some examples, when a video coder (e.g., video encoder 200 or video decoder 300) derives a collocated block position, the video coder may derive a temporal motion vector predictor for a sub-block based temporal MV predictor using reference sub-picture boundaries together with current sub-picture boundaries to determine a correct collocated block position.

For example, a video coder (e.g., video encoder 200 or video decoder 300) may be configured to form, colPos=blockPos−curSubPicBoundaryPos+refSub-PicBoundaryPos. The video coder may be configured to compare a collocated block position colPos against a bottom boundary position of the reference sub-picture and/or a right boundary position of the reference sub-picture and not the current sub-picture, because those sub-picture positions may be different within a picture, where blockPos may represent the current bock position in the current sub-picture.

Using VVC draft language, in some examples, techniques described herein may be implemented as follows with the changes highlighted with "→" and "←". For example, a video coder (e.g., video encoder 200 or video decoder 300) may be configured to execute one or more steps of the following process. Changes relative VVC draft 7 in the TMVP derivation example are highlighted with "→" and "←"

8.5.2.11 Derivation Process for Temporal Luma Motion Vector Prediction
Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples,
a reference index refIdxLX, with X being 0 or 1.
Outputs of this process are:
the motion vector prediction mvLXCol in 1/16 fractional-sample accuracy,
the availability flag availableFlagLXCol.
The variable currCb specifies the current luma coding block at luma location (xCb, yCb).
The variables mvLXCol and availableFlagLXCol are derived as follows:
If pic_temporal_mvp_enabled_flag is equal to 0 or (cbWidth*cbHeight) is less than or equal to 32, both components of mvLXCol are set equal to 0 and availableFlagLXCol is set equal to 0.
Otherwise (pic_temporal_mvp_enabled_flag is equal to 1), the following ordered steps apply:
→
1. The variable picW is set equal to pic_width_in_luma_samples of the referenfce picture refPicLX and the variable picH is set equal to pic_height_in_luma_samples of the reference picture refPicLX.
RefSubPicIdx is derived to be such that SubpicIdList[RefSubPicIdx] of the reference picture is equal to slice_subpic_id.
The variables RefSubPicLeftBoundaryPos, RefSubPicTopBoundaryPos, RefSubPicRightBoundaryPos, and RefSubPicBotBoundaryPos are derived as follows:

RefSubPicLeftBoundaryPos=subpic_ctu_top_left_x[RefSubPicIdx]*CtbSizeY

RefSubPicRightBoundaryPos=Min(picW−1, (subpic_ctu_top_left_x[RefSubPicIdx]+subpic_width_minus1[RefSubPicIdx]+1)*CtbSizeY−1)

RefSubPicTopBoundaryPos=subpic_ctu_top_lefty[RefSubPicIdx]*CtbSize

RefSubPicBotBoundaryPos=Min(picH−1, (subpic_ctu_top_left_y[RefSubPicIdx]+subpic_height_minus1[RefSubPicId x]+1)*CtbSizeY−1)

2. The bottom right collocated motion vector and the bottom and right boundary sample locations are derived as follows:

leftBoundaryPos=subpic_treated_as_pic_flag[SubPicIdx]?

SubPicLeftBoundaryPos: 0 topBoundaryPos=subpic_treated_as_pic_flag[SubPicIdx]?

SubPicTopBoundaryPos: 0 refRightBoundaryPos=subpic_treated_as_pic_flag[SubPicIdx]?

RefSubPicRightBoundaryPos: pic_width_in_luma_samples−1 refBotBoundaryPos=subpic_treated_as_pic_flag[SubPicIdx]?

RefSubPicBotBoundaryPos: pic_height_in_luma_samples−1 refLeftBoundaryPos=subpic_treated_as_pic_flag
[SubPicIdx]?

RefSubPicLeftBoundaryPos: 0 refTopBoundaryPos=subpic_treated_as_pic_flag[Sub-
PicIdx]?

RefSubPicTopBoundaryPos: 0 xColBr=xCb+cbWidth−leftBoundaryPos+refLeft-
BoundaryPos yColBr=yCb+cbHeight−topBoundaryPos+refTop-
BoundaryPos

←

If yCb>>CtbLog2SizeY is equal to yColBr>>CtbLog2SizeY, yColBr is less than or equal to →refBotBoundaryPos←and xColBr is less than or equal to →refRightBoundaryPos←, the following applies:
  The variable colCb specifies the luma coding block covering the modified location given by ((xColBr>>3)<<3, (yColBr>>3)<<3) inside the collocated picture specified by ColPic.
  The luma location (xColCb, yColCb) is set equal to the top-left sample of the collocated luma coding block specified by colCb relative to the top-left luma sample of the collocated picture specified by ColPic.
  The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.
Otherwise, both components of mvLXCol are set equal to 0 and availableFlagLXCol is set equal to 0.
3. When availableFlagLXCol is equal to 0, the central collocated motion vector is derived as follows:

xColCtr=xCb+(cbWidth>>1)→−leftBoundaryPos+
refLeftBoundaryPos← yColCtr=yCb+(cbHeight>>1)→−topBoundaryPos+refTop-
BoundaryPos←
  The variable colCb specifies the luma coding block covering the modified location given by ((xColCtr>>3)<<3, (yColCtr>>3)<<3) inside the collocated picture specified by ColPic.
  The luma location (xColCb, yColCb) is set equal to the top-left sample of the collocated luma coding block specified by colCb relative to the top-left luma sample of the collocated picture specified by ColPic.
  The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.
In VVC draft 7, picture size of the collocated picture shall be equal to the current picture size. If it is not the case, then pic_width_in_luma_samples and pic_height_in_luma_samples should be width and height of the collocated picture when deriving reference sub-picture position.
In some examples, TMVP shall be disabled if sub-picture reordering is applied or when a sub-picture is treated as a picture, or when a current and a reference sub-pictures have different sizes. For example, a video coder (e.g., video encoder 200 or video decoder 300) may be configured to disable TMVP in response to determining that sub-picture reordering is applied. In some examples, the video coder may be configured to disable TMVP in response to determining that a sub-picture is treated as a picture. In some examples, the video coder may be configured to disable TMVP in response to determining that a current and a reference sub-pictures have different sizes.

Example 1

8.5.6.3.1 General
  Inputs to this process are:
    a luma location (xSb, ySb) specifying the top-left sample of the current coding subblock relative to the top-left luma sample of the current picture,
    a variable sbWidth specifying the width of the current coding subblock,
    a variable sbHeight specifying the height of the current coding subblock,
    a motion vector offset mvOffset,
    a refined motion vector refMvLX,
    the selected reference picture sample array refPicLX,
    the half sample interpolation filter index hpelIfIdx,
    the bi-directional optical flow flag bdofFlag,
    a variable cIdx specifying the colour component index of the current block,
    a list of two scaling ratios, horizontal and vertical, scalingRatio.
  Outputs of this process are:
    an (sbWidth+brdExtSize)×(sbHeight+brdExtSize) array predSamplesLX of prediction sample values.
  The prediction block border extension size brdExtSize is derived as follows:

$$\text{brdExtSize}=(\text{bdofFlag}(\text{inter\_affine\_flag}[xSb][ySb] \&\&!\text{pic\_disable\_prof\_flag}))?2:0 \quad (936)$$

\*\*The variables leftBoundaryOffset is set equal to scaling_win_left_offset, topBoundaryOffset is set equal to scaling_win_top_offset, refSubPicLeftBoundaryPos, and refSubPicTopBoundaryPos are set equal to 0.\*\*
  \*\*If subpic_treated_as_pic_flag[SubPicIdx] is equal to 1, the following applies:\*\*
    \*\*leftBoundaryOffset+=SubPicLeftBoundaryPos\*\*
    \*\*topBoundaryOffset+=SubPicTopBoundaryPos\*\*
    \*\*RefSubPicIdx is derived to be such that SubpicIdList[RefSubPicIdx] of the reference picture is equal to slice_subpic_id.\*\*
    \*\*refSubPicLeftBoundaryPos=subpic_ctu_top_left_x[RefSubPicIdx]*CtbSizeY\*\*
    \*\*refSubPicTopBoundaryPos=subpic_ctu_top_left_y[RefSubPicIdx]*CtbSizeY\*\*
  The variable fRefLeftOffset is set equal to ((scaling_win_left_offset\*\*+refSubPicLeftBoundaryPos\*\*)<<10), where scaling_win_left_offset is the scaling_win_left_offset for the reference picture.
  The variable fRefTopOffset is set equal to ((scaling_win_top_offset\*\*+refSubPicTopBoundaryPos\*\*)<<10), where scaling_win_top_offset is the scaling_win_top_offset for the reference picture.
  The (sbWidth+brdExtSize)×(sbHeight+brdExtSize) array predSamplesLX of prediction sample values is derived as follows:
    The motion vector mvLX is set equal to (refMvLX−mvOffset).

If cIdx is equal to 0, the following applies:
  Let $(xInt_L, yInt_L)$ be a luma location given in full-sample units and $(xFrac_L, yFrac_L)$ be an offset given in 1/16-sample units. These variables are used only in this clause for specifying fractional-sample locations inside the reference sample arrays refPicLX.
  The top-left coordinate of the bounding block for reference sample padding $(xSbInt_L, ySbInt_L)$ is set equal to $(xSb+(mvLX[0]>>4), ySb+(mvLX[1]>>4))$.
  For each luma sample location $(x_L=0 \ldots sbWidth-1+brdExtSize, y_L=0 \ldots sbHeight-1+brdExtSize)$ inside the prediction luma sample array predSamplesLX, the corresponding prediction luma sample value predSamplesLX$[x_L][y_L]$ is derived as follows:
    Let $(refxSb_L, refySb_L)$ and $(refx_L, refy_L)$ be luma locations pointed to by a motion vector $(refMvLX[0], refMvLX[1])$ given in 1/16-sample units. The variables $refxSb_L$, $refx_L$, $refySb_L$, and $refy_L$ are derived as follows:

$$refxSb_L=(((xSb-leftBoundaryOffset \leftarrow scaling\_win\_left\_offset \leftarrow)<<4)+refMvLX[0])*scalingRatio[0] \quad (937)$$

$$refx_L=((Sign(refxSb_L)*((Abs(refxSb_L)+128)>>8)+x_L*((scalingRatio[0]+8)>>4))+fRefLeftOffset+32)>>6 \quad (938)$$

$$refySb_L=(((ySb-topBoundaryOffset \leftarrow scaling\_win\_top\_offset \leftarrow)<<4)+refMvLX[1])*scalingRatio[1] \quad (939)$$

$$refy_L=((Sign(refySb_L)*((Abs(refySb_L)+128)>>8)+y_L*((scalingRatio[1]+8)>>4))+fRefTopOffset+32)>>6 \quad (940)$$

The variables $xInt_L$, $yInt_L$, $xFrac_L$ and $yFrac_L$ are derived as follows:

$$xInt_L=refx_L>>4 \quad (941)$$

$$yInt_L=refy_L>>4 \quad (942)$$

$$xFrac_L=refx_L\&15 \quad (943)$$

$$yFrac_L=refy_L\&15 \quad (944)$$

The prediction luma sample value predSamplesLX$[x_L][y_L]$ is derived as follows:
  If bdofFlag is equal to TRUE or (pic_disable_prof_flag is equal to FALSE and inter_affine_flag[xSb][ySb] is equal to TRUE), and one or more of the following conditions are true, the prediction luma sample value predSamplesLX$[x_L][y_L]$ is derived by invoking the luma integer sample fetching process as specified in clause 8.5.6.3.3 with $(xInt_L+(xFrac_L>>3)-1, yInt_L+(yFrac_L>>3)-1)$ and refPicLX as inputs.
    $x_L$ is equal to 0.
    $x_L$ is equal to sbWidth+1.
    $y_L$ is equal to 0.
    $y_L$ is equal to sbHeight+1.
  Otherwise, the prediction luma sample value predSamplesLX[xL][yL] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), $(xSbInt_L, ySbInt_L)$, refPicLX, hpelIfIdx, sbWidth, sbHeight, scalingRatio[0], scalingRatio[1], and (xSb, ySb) as inputs.

Otherwise (cIdx is not equal to 0), the following applies:
  Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
  The top-left coordinate of the bounding block for reference sample padding (xSbIntC, ySbIntC) is set equal to $((xSb/SubWidthC)+(mvLX[0]>>5), (ySb/SubHeightC)+(mvLX[1]>>5))$.
  For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:
    Let $(refxSb_C, refySb_C)$ and $(refx_C, refy_C)$ be chroma locations pointed to by a motion vector (refMvLX[0], refMvLX[1]) given in 1/32-sample units. The variables $refxSb_C$, $refySb_C$, $refx_C$ and $refy_C$ are derived as follows:

$$addX=sps\_chroma\_horizontal\_collocated\_flag?0:8*(scalingRatio[0]-(1<<14)) \quad (945)$$

$$addY=sps\_chroma\_vertical\_collocated\_flag?0:8*(scalingRatio[1]-(1<<14)) \quad (946)$$

$$refxSb_C=(((xSb-leftBoundaryOffset \rightarrow scaling\_win\_left\_offset \leftarrow)/SubWidthC<<5)+refMvLX[0])*scalingRatio[0]+addX \quad (947)$$

$$refx_C=((Sign(refxSb_C)*((Abs(refxSb_C)+256)>>9)+xC*((scalingRatio[0]+8)>>4))+fRefLeftOffset/SubWidthC+16)>>5 \quad (948)$$

$$refySb_C=(((ySb-**topBoundaryOffset \rightarrow scaling\_win\_top\_offset \leftarrow)/SubHeightC<<5)+refMvLX[1])*scalingRatio[1]+addY \quad (949)$$

$$refy_C=((Sign(refySb_C)*((Abs(refySb_C)+256)>>9)+yC*((scalingRatio[1]+8)>>4))+fRefTopOffset/SubHeightC+16)>>5 \quad (950)$$

The variables $xInt_C$, $yInt_C$, $xFrac_C$ and $yFrac_C$ are derived as follows:

$$xInt_C=refx_C>>5 \quad (951)$$

$$yInt_C=refy_C>>5 \quad (952)$$

$$xFrac_C=refx_C\&31 \quad (953)$$

$$yFrac_C=refy_C\&31 \quad (954)$$

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight, refPicLX, scalingRatio[0], and scalingRatio[1] as inputs.
NOTE—Unlike the process specified in clause 8.4.5.2.13, this process uses both sps_chroma_vertical_collocated_flag and sps_chroma_horizontal_collocated_flag.

Example IIA

A specification modification example is as follows with changes indicated by "***".

8.5.3.2.2 Luma Sample Bilinear Interpolation Process
Inputs to this process are:
a luma location in full-sample units ($xInt_L$, $yInt_L$),
a luma location in fractional-sample units ($xFrac_L$, $yFrac_L$),
the luma reference sample array $refPicLX_L$.
Output of this process is a predicted luma sample value $predSampleLX_L$
The variables shift1, shift2, shift3, shift4, offset1, offset2 and offset3 are derived as follows:

$$shift1 = BitDepth - 6 \quad (635)$$

$$offset1 = 1 << (shift1 - 1) \quad (636)$$

$$shift2 = 4 \quad (637)$$

$$offset2 = 1 << (shift2 - 1) \quad (638)$$

$$shift3 = 10 - BitDepth \quad (639)$$

$$shift4 = BitDepth - 10 \quad (640)$$

$$offset4 = 1 << (shift4 - 1) \quad (641)$$

The variable picW is set equal to pic_width_in_luma_samples *a the referenfce picture refPicLX* and the variable picH is set equal to pic_height_in_luma_samples *of the reference picture refPicLX*.

The luma interpolation filter coefficients $fb_L[p]$ for each 1/16 fractional sample position p equal to $xFrac_L$ or $yFrac_L$ are specified in Table 28.

The luma locations in full-sample units ($xInt_i$, $yInt_i$) are derived as follows for i=0 . . . 1:

If subpic_treated_as_pic_flag[SubPicIdx] is equal to 1, the following applies:
***RefSubPicIdx is derived to be such that SubpicIdList[RefSubPicIdx] of the reference picture is equal to slice_subpic_id.

The variables RefSubPicLeftBoundaryPos, RefSubPicTopBoundaryPos, RefSubPicRightBoundaryPos, and RefSubPicBotBoundaryPos are derived as follows:

$$RefSubPicLeftBoundaryPos = subpic\_ctu\_top\_left\_x[RefSubPicIdx]*CtbSizeY$$

$$RefSubPicRightBoundaryPos = Min(picW-1, (subpic\_ctu\_top\_left\_x[RefSubPicIdx]+subpic\_width\_minus1[RefSubPicIdx]+1)*CtbSizeY-1)$$

$$RefSubPicTopBoundaryPos = subpic\_ctu\_top\_left\_y[RefSubPicIdx]*CtbSize$$

$$RefSubPicBotBoundaryPos = Min(picH-1, (subpic\_ctu\_top\_left\_y[RefSubPicIdx]+subpic\_height\_minus1[RefSubPicIdx]+1)*CtbSizeY-1)***$$

$$xInt_i = Clip3(*Ref*SubPicLeftBoundaryPos, *Ref*SubPicRightBoundaryPos, xInt_L+i) \quad (642)$$

$$yInt_i = Clip3(*Ref*SubPicTopBoundaryPos, *Ref*SubPicBotBoundaryPos, yInt_L+i) \quad (643)$$

Otherwise (subpic_treated_as_pic_flag[SubPicIdx] is equal to 0), the following applies:

$$xInt_i = Clip3(0, picW-1, sps\_ref\_wraparound\_enabled\_flag?ClipH((sps\_ref\_wraparound\_offset\_minus1+1)*MinCbSizeY, picW, (xInt_L+i)):xInt_L+i) \quad (644)$$

$$yInt_i = Clip3(0, picH-1, yInt_L+i) \quad (645)$$

The predicted luma sample value $predSampleLX_L$ is derived as follows:
If both $xFrac_L$ and $yFrac_L$ are equal to 0, the value of $predSampleLX_L$ is derived as follows:

$$predSampleLX_L = BitDepth <= 10?(refPicLX_L[xInt_0][yInt_0] << shift3):((refPicLX_L[xInt_0][yInt_0]+offset4)>>shift4) \quad (646)$$

Otherwise, if $xFrac_L$ is not equal to 0 and $yFrac_L$ is equal to 0, the value of $predSampleLX_L$ is derived as follows:

$$predSampleLX_L = ((\Sigma_{i=0}^{1} f_L[xFrac_L][i]*refPicLX_L[xInt_i][yInt_0])+offset1)>>shift1 \quad (647)$$

Otherwise, if $xFrac_L$ is equal to 0 and $yFrac_L$ is not equal to 0, the value of $predSampleLX_L$ is derived as follows:

$$predSampleLX_L = ((\Sigma_{i=0}^{1} f_L[yFrac_L][i]*refPicLX_L[xInt_0][yInt_i])+offset1)>>shift1 \quad (648)$$

Otherwise, if $xFrac_L$ is not equal to 0 and $yFrac_L$ is not equal to 0, the value of $predSampleLX_L$ is derived as follows:
The sample array temp[n] with n=0 . . . 1, is derived as follows:

$$temp[n] = ((\Sigma_{i=0}^{1} f_L[xFrac_L][i]*refPicLX_L[xInt_i][yInt_n])+offset1)>>shift1 \quad (649)$$

The predicted luma sample value $predSampleLX_L$ is derived as follows:

$$predSampleLX_L = ((\Sigma_{i=0}^{1} f_L[yFrac_L][i]*temp[i])+offset2)>>shift2 \quad (650)$$

8.5.6.3 Fractional Sample Interpolation Process
8.5.6.3.1 General
Inputs to this process are:
a luma location (xSb, ySb) specifying the top-left sample of the current coding subblock relative to the top-left luma sample of the current picture,
a variable sbWidth specifying the width of the current coding subblock,
a variable sbHeight specifying the height of the current coding subblock,
a motion vector offset mvOffset,
a refined motion vector refMvLX,
the selected reference picture sample array refPicLX,
the half sample interpolation filter index hpelIfIdx,
the bi-directional optical flow flag bdofFlag,
a variable cIdx specifying the colour component index of the current block,
a list of two scaling ratios, horizontal and vertical, scalingRatio.

Outputs of this process are:
an (sbWidth+brdExtSize)×(sbHeight+brdExtSize) array predSamplesLX of prediction sample values.

The prediction block border extension size brdExtSize is derived as follows:

$$brdExtSize = (bdofFlag || (inter\_affine\_flag[xSb][ySb] \&\& !pic\_disable\_prof\_flag))?2:0 \quad (936)$$

***The variables leftBoundaryOffset is set equal to scaling_win_left_offset, topBoundaryOffset is set equal to scaling_win_top_offset, refSubPicLeftBoundaryPos, and refSubPicTopBoundaryPos are set equal to 0.

If subpic_treated_as_pic_flag[SubPicIdx] is equal to 1, the following applies:
leftBoundaryOffset+=SubPicLeftBoundaryPos
topBoundaryOffset+=SubPicTopBoundaryPos
RefSubPicIdx is derived to be such that SubpicIdList[RefSubPicIdx] of the reference picture is equal to slice_subpic_id.
refSubPicLeftBoundaryPos=subpic_ctu_top_left_x[RefSubPicIdx]*CtbSizeY refSubPicTopBoundaryPos=subpic_ctu_top_left_y[Ref-SubPicIdx]*CtbSizeY**

The variable fRefLeftOffset is set equal to (*(*scaling_win_left_offset *+refSubPicLeftBoundaryPos)*<<10), where scaling_win_left_offset is the scaling_win_left_offset for the reference picture.

The variable fRefTopOffset is set equal to (*(*scaling_win_top_offset *+refSubPicTopBoundaryPos)*<<10), where scaling_win_top_offset is the scaling_win_top_offset for the reference picture.

The (sbWidth+brdExtSize)×(sbHeight+brdExtSize) array predSamplesLX of prediction sample values is derived as follows:

The motion vector mvLX is set equal to (refMvLX−mvOffset).

If cIdx is equal to 0, the following applies:

Let ($xInt_L$, $yInt_L$) be a luma location given in full-sample units and ($xFrac_L$, $yFrac_L$) be an offset given in 1/16-sample units. These variables are used only in this clause for specifying fractional-sample locations inside the reference sample arrays refPicLX.

The top-left coordinate of the bounding block for reference sample padding ($xSbInt_L$, $ySbInt_L$) is set equal to (xSb+(mvLX[0]>>4), ySb+(mvLX[1]>>4)).

For each luma sample location ($x_L$=0 ... sbWidth−1+brdExtSize, $y_L$=0 ... sbHeight−1+brdExtSize) inside the prediction luma sample array predSamplesLX, the corresponding prediction luma sample value predSamplesLX[$x_L$][$y_L$] is derived as follows:

Let ($refxSb_L$, $refySb_L$) and ($refx_L$, $refy_L$) be luma locations pointed to by a motion vector (refMvLX[0], refMvLX[1]) given in 1/16-sample units. The variables $refxSb_L$, $refx_L$, $refySb_L$, and $refy_L$ are derived as follows:

$$refxSb_L=(((xSb-*leftBoundaryOffset*)<<4)+refMvLX[0])*scalingRatio[0] \quad (937)$$

$$refx_L=((Sign(refxSb_L)*((Abs(refxSb_L)+128)>>8)+x_L*((scalingRatio[0]+8)>>4))+fRefLeftOffset+32)>>6 \quad (938)$$

$$refySb_L=(((ySb-*topBoundaryOffset*)<<4)+refMvLX[1])*scalingRatio[1] \quad (939)$$

$$refy_L=((Sign(refySb_L)*((Abs(refySb_L)+128)>>8)+yL*((scalingRatio[1]+8)>>4))+fRefTopOffset+32)>>6 \quad (940)$$

The variables $xInt_L$, $yInt_L$, $xFrac_L$ and $yFrac_L$ are derived as follows:

$$xInt_L=refx_L>>4 \quad (941)$$

$$yInt_L=refy_L>>4 \quad (942)$$

$$xFrac_L=refx_L\&15 \quad (943)$$

$$yFrac_L=refy_L\&15 \quad (944)$$

The prediction luma sample value predSamplesLX[$x_L$][$y_L$] is derived as follows:

If bdofFlag is equal to TRUE or (pic_disable_prof_flag is equal to FALSE and inter_affine_flag[xSb][ySb] is equal to TRUE), and one or more of the following conditions are true, the prediction luma sample value predSamplesLX[$x_L$][$y_L$] is derived by invoking the luma integer sample fetching process as specified in clause 8.5.6.3.3 with ($xInt_L$+($xFrac_L$>>3)−1), $yInt_L$+($yFrac_L$>>3)−1) and refPicLX as inputs.

$x_L$ is equal to 0.

$x_L$ is equal to sbWidth+1.

$y_L$ is equal to 0.

$y_L$, is equal to sbHeight+1.

Otherwise, the prediction luma sample value predSamplesLX[$x_L$][$y_L$] is derived by invoking the luma sample 8-tap interpolation filtering process as specified in clause 8.5.6.3.2 with (xIntL−(brdExtSize>0?1:0), yIntL−(brdExtSize>0?1:0)), (xFracL, yFracL), (xSbIntL, ySbIntL), refPicLX, hpelIfIdx, sbWidth, sbHeight, scalingRatio[0], scalingRatio[1], and (xSb, ySb) as inputs.

Otherwise (cIdx is not equal to 0), the following applies:

Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.

The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).

For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:

Let ($refxSb_C$, $refySb_C$) and ($refx_C$, $refy_C$) be chroma locations pointed to by a motion vector (refMvLX[0], refMvLX[1]) given in 1/32-sample units. The variables $refxSb_C$, $refySb_C$, $refx_C$ and $refy_C$ are derived as follows:

$$addX=sps\_chroma\_horizontal\_collocated\_flag?0:8*(scalingRatio[0]-(1<<14)) \quad (945)$$

$$addY=sps\_chroma\_vertical\_collocated\_flag?0:8*(scalingRatio[1]-(1<<14)) \quad (946)$$

$$refxSb_C=(((xSb-*leftBoundaryOffset*)/SubWidthC<<5)+refMvLX[0])*scalingRatio[0]+addX \quad (947)$$

$$refx_C=((Sign(refxSb_C)*((Abs(refxSb_C)+256)>>9)+xC*((scalingRatio[0]+8)>>4))+fRefLeftOffset/SubWidthC+16)>>5 \quad (948)$$

$$refySb_C=(((ySb-*topBoundaryOffset*)/SubHeightC<<5)+refMvLX[1])*scalingRatio[1]+addY \quad (949)$$

$$refy_C=((Sign(refySb_C)*((Abs(refySb_C)+256)>>9)+yC*((scalingRatio[1]+8)>>4))+fRefTopOffset/SubHeightC+16)>>5 \quad (950)$$

The variables $xInt_C$, $yInt_C$, $xFrac_C$ and $yFrac_C$ are derived as follows:

$$xInt_C=refx_C>>5 \quad (951)$$

$$yInt_C=refy_C>>5 \quad (952)$$

$$xFrac_C=refx_C\&31 \quad (953)$$

$$yFrac_C=refy_C\&31 \quad (954)$$

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight, refPicLX, scalingRatio[0], and scalingRatio[1] as inputs.

NOTE—Unlike the process specified in clause 8.4.5.2.13, this process uses both sps_chroma_vertical_collocated_flag and sps_chroma_horizontal_collocated_flag.

8.5.6.3.2 Luma Sample Interpolation Filtering Process

Inputs to this process are:
- a luma location in full-sample units ($xInt_L$, $yInt_L$),
- a luma location in fractional-sample units ($xFrac_L$, $yFrac_L$),
- a luma location in full-sample units ($xSbInt_L$, $ySbInt_L$) specifying the top-left sample of the bounding block for reference sample padding relative to the top-left luma sample of the reference picture,
- the luma reference sample array $refPicLX_L$,
- the half sample interpolation filter index hpelIfIdx,
- a variable sbWidth specifying the width of the current subblock,
- a variable sbHeight specifying the height of the current subblock,
- a fixedpoint representation of the horizontal scaling factor scalingRatio[0],
- a fixedpoint representation of the vertical scaling factor scalingRatio[1],
- a luma location (xSb, ySb) specifying the top-left sample of the current subblock relative to the top-left luma sample of the current picture.

Output of this process is a predicted luma sample value $predSampleLX_L$

The variables shift1, shift2 and shift3 are derived as follows:
The variable shift1 is set equal to Min(4, BitDepth−8), the variable shift2 is set equal to 6 and the variable shift3 is set equal to Max(2, 14−BitDepth).

The variable picW is set equal to pic_width_in_luma_samples *of the reference picture refPicLX* and the variable picH is set equal to pic_height_in_luma_samples *of the reference picture refPicLX*.

The horizontal luma interpolation filter coefficients $f_{LH}[p]$ for each 1/16 fractional sample position p equal to $xFrac_L$ or $yFrac_L$ are derived as follows:

If MotionModelIdc[xSb][ySb] is greater than 0, and sbWidth and sbHeight are both equal to 4, the luma interpolation filter coefficients fLH[p] are specified in Table 32.

Otherwise, if scalingRatio[0] is greater than 28672, luma interpolation filter coefficients $f_{LH}[p]$ are specified in Table 30.

Otherwise, if scalingRatio[0] is greater than 20480, luma interpolation filter coefficients $f_{LH}[p]$ are specified in Table 31.

Otherwise, the luma interpolation filter coefficients $f_{LH}[p]$ are specified in Table 29 depending on hpelIfIdx.

The vertical luma interpolation filter coefficients $f_{LH}[p]$ for each 1/16 fractional sample position p equal to $yFrac_L$ are derived as follows:

If MotionModelIdc[xSb][ySb] is greater than 0, and sbWidth and sbHeight are both equal to 4, the luma interpolation filter coefficients fLV[p] are specified in Table 32.

Otherwise, if scalingRatio[1] is greater than 28672, luma interpolation filter coefficients $f_{LV}[p]$ are specified in Table 30.

Otherwise, if scalingRatio[1] is greater than 20480, luma interpolation filter coefficients $f_{LV}[p]$ are specified in Table 31.

Otherwise, the luma interpolation filter coefficients $f_{LV}[p]$ are specified in Table 29 depending on hpelIfIdx.

The luma locations in full-sample units ($xInt_i$, $yInt_i$) are derived as follows for i=0 . . . 7:

If subpic_treated_as_pic_flag[SubPicIdx] is equal to 1, the following applies:
***RefSubPicIdx is derived to be such that SubpicIdList [RefSubPicIdx] of the reference picture is equal to slice_subpic_id.

The variables RefSubPicLeftBoundaryPos, RefSubPicTopBoundaryPos, RefSubPicRightBoundaryPos, and RefSubPicBotBoundaryPos are derived as follows:

RefSubPicLeftBoundaryPos=subpic_ctu_top_left_x[RefSubPicIdx]*CtbSizeY

RefSubPicRightBoundaryPos=Min(picW−1, (subpic_ctu_top_left_x[RefSubPicIdx]+subpic_width_minus1[RefSubPicIdx]+1)*CtbSizeY−1)

RefSubPicTopBoundaryPos=subpic_ctu_top_left_y[RefSubPicIdx]*CtbSize

RefSubPicBotBoundaryPos=Min(picH−1, (subpic_ctu_top_left_y[RefSubPicIdx]+subpic_height_minus1[RefSubPicId x]+1)*CtbSizeY−1)***

$$xInt_i=Clip3(*Ref*SubPicLeftBoundaryPos, *Ref*SubPicRightBoundaryPos, xInt_L+i−3) \quad (955)$$

$$yInt_i=Clip3(*Ref*SubPicTopBoundaryPos, *Ref*SubPicBotBoundaryPos, yInt_L+i−3) \quad (956)$$

Otherwise (subpic_treated_as_pic_flag[SubPicIdx] is equal to 0), the following applies:

$$xInt_i=Clip3(0, picW−1, sps\_ref\_wraparound\_enabled\_flag?ClipH((sps\_ref\_wraparound\_offset\_minus1+1)*MinCbSizeY, picW, xInt_L+i−3):xInt_L+i−3) \quad (957)$$

$$yInt_i=Clip3(0, picH−1, yInt_L+i−3) \quad (958)$$

The luma locations in full-sample units are further modified as follows for i=0 . . . 7:

$$xInt_i=Clip3(xSbInt_L−3, xSbInt_L+sbWidth+4, xInt_i) \quad (959)$$

$$yInt_i=Clip3(ySbInt_L−3, ySbInt_L+sbHeight+4, yInt_i) \quad (960)$$

The predicted luma sample value $predSampleLX_L$ is derived as follows:

If both $xFrac_L$ and $yFrac_L$ are equal to 0, and both scalingRatio[0] and scalingRatio[1] are less than 20481, the value of $predSampleLX_L$ is derived as follows:

$$predSampleLX_L=refPicLX_L[xInt_3][yInt_3]<<shift3 \quad (961)$$

Otherwise, if $yFrac_L$ is equal to 0 and scalingRatio[1] is less than 20481, the value of $predSampleLX_L$ is derived as follows:

$$predSampleLX_L=(\Sigma_{i=0}^{7} f_{LH}[xFrac_L][i]*refPicLX_L[xInt_i][yInt_3])>>shift1 \quad (962)$$

Otherwise, if $xFrac_L$ is equal to 0 and scalingRatio[0] is less than 20481, the value of $predSampleLX_L$ is derived as follows:

$$predSampleLX_L=(\Sigma_{i=0}^{7} f_{LV}[yFrac_L][i]*refPicLX_L[xInt_3][yInt_i])>>shift1 \quad (963)$$

Otherwise, the value of $predSampleLX_L$ is derived as follows:
The sample array temp[n] with n=0 . . . 7, is derived as follows:

$$temp[n]=(\Sigma_{i=0}^{7} f_{LH}[xFrac_L][i]*refPicLX_L[xInt_i][yInt_i])>>shift1 \quad (964)$$

The predicted luma sample value predSampleLX$_L$ is derived as follows:

$$\text{predSampleLX}_L = (\Sigma_{i=0}^{7} f_{LV}[\text{yFrac}_L][i] * \text{temp}[i]) >> \text{shift2} \quad (965)$$

8.5.6.3.3 Luma Integer Sample Fetching Process

Inputs to this process are:
a luma location in full-sample units (xInt$_L$, yInt$_L$),
the luma reference sample array refPicLX$_L$, Output of this process is a predicted luma sample value predSampleLX$_L$ The variable shift is set equal to Max(2, 14−BitDepth).

The variable picW is set equal to pic_width_in_luma_samples *of the reference picture refPicLX* and the variable picH is set equal to pic_height_in_luma_samples *of the reference picture refPicLX*.

The luma locations in full-sample units (xInt, yInt) are derived as follows:

If subpic_treated_as_pic_flag[SubPicIdx] is equal to 1, the following applies: ***RefSubPicIdx is derived to be such that SubpicIdList[RefSubPicIdx] of the reference picture is equal to slice_subpic_id.

The variables RefSubPicLeftBoundaryPos, RefSubPicTopBoundaryPos,

RefSubPicRightBoundaryPos, and RefSubPicBotBoundaryPos are derived as follows:

RefSubPicLeftBoundaryPos=subpic_ctu_top_left_x[RefSubPicIdx]*CtbSizeY

RefSubPicRightBoundaryPos=Min(picW−1, (subpic_ctu_top_left_x[RefSubPicIdx]+subpic_width_minus1[RefSubPicIdx]+1)*CtbSizeY−1)

RefSubPicTopBoundaryPos=subpic_ctu_top_left_y[RefSubPicIdx]*CtbSize

RefSubPicBotBoundaryPos=Min(picH−1, (subpic_ctu_top_left_y[RefSubPicIdx]+subpic_height_minus1[RefSubPicId x]+1)*CtbSizeY−1)***

$$\text{xInt}=\text{Clip3}(\text{*Ref*SubPicLeftBoundaryPos}, \text{*Ref*SubPicRightBoundaryPos}, \text{xInt}_L) \quad (966)$$

$$\text{yInt}=\text{Clip3}(\text{*Ref*SubPicTopBoundaryPos}, \text{*Ref*SubPicBotBoundaryPos}, \text{yInt}_L) \quad (967)$$

Otherwise, the following applies:

$$\text{xInt}=\text{Clip3}(0, \text{picW}-1, \text{sps\_ref\_wraparound\_enabled\_flag?} \quad (968)$$

$$\text{ClipH}((\text{sps\_ref\_wraparound\_offset\_minus1}+1)*\text{MinCbSizeY}, \text{picW}, \text{xInt}_L):\text{xInt}_L)\text{yInt}=\text{Clip3}(0, \text{picH}-1, \text{yInt}_L) \quad (969)$$

The predicted luma sample value predSampleLX$_L$ is derived as follows:

$$\text{predSampleLX}_L = \text{refPicLX}_L[\text{xInt}][\text{yInt}] << \text{shift3} \quad (970)$$

8.5.6.3.4 Chroma Sample Interpolation Process

Inputs to this process are:
a chroma location in full-sample units (xInt$_C$, yInt$_C$),
a chroma location in 1/32 fractional-sample units (xFrac$_C$, yFrac$_C$),
a chroma location in full-sample units (xSbIntC, ySbIntC) specifying the top-left sample of the bounding block for reference sample padding relative to the top-left chroma sample of the reference picture,
a variable sbWidth specifying the width of the current subblock,
a variable sbHeight specifying the height of the current subblock,
the chroma reference sample array refPicLX$_C$,
a fixedpoint representation of the horizontal scaling factor scalingRatio[0],
a fixedpoint representation of the vertical scaling factor scalingRatio[1].

Output of this process is a predicted chroma sample value predSampleLX$_C$

The variables shift1, shift2 and shift3 are derived as follows:

The variable shift1 is set equal to Min(4, BitDepth−8), the variable shift2 is set equal to 6 and the variable shift3 is set equal to Max(2, 14−BitDepth).

The variable picW$_C$ is set equal to pic_width_in_luma_samples/SubWidthC *of the reference picture refPicLX* and the variable picHc is set equal to pic_height_in_luma_samples/SubHeightC *of the reference picture refPicLX*.

The horizontal chroma interpolation filter coefficients f$_{CH}$[p] for each 1/32 fractional sample position p equal to xFrac$_C$ are derived as follows:

If scalingRatio[0] is greater than 28672, chroma interpolation filter coefficients f$_{CH}$[p] are specified in Table 35.

Otherwise, if scalingRatio[0] is greater than 20480, chroma interpolation filter coefficients f$_{CH}$[p] are specified in Table 60.

Otherwise, chroma interpolation filter coefficients f$_{CH}$[p] are specified in Table 33.

The vertical chroma interpolation filter coefficients f$_{CV}$[p] for each 1/32 fractional sample position p equal to yFrac$_C$ are derived as follows:

If scalingRatio[1] is greater than 28672, chroma interpolation filter coefficients f$_{CV}$[p] are specified in Table 35.

Otherwise, if scalingRatio[1] is greater than 20480, chroma interpolation filter coefficients f$_{CV}$[p] are specified in Table 60.

Otherwise, chroma interpolation filter coefficients f$_{CV}$[p] are specified in Table 33.

The variable xOffset is set equal to (sps_ref_wraparound_offset_minus1+1)*MinCbSizeY)/SubWidthC.

The chroma locations in full-sample units (xInt$_i$, yInt$_i$) are derived as follows for i=0 . . . 3:

If subpic_treated_as_pic_flag[SubPicIdx] is equal to 1, the following applies: ***RefSubPicIdx is derived to be such that SubpicIdList[RefSubPicIdx] of the reference picture is equal to slice_subpic_id.

The variables RefSubPicLeftBoundaryPos, RefSubPicTopBoundaryPos, RefSubPicRightBoundaryPos, and RefSubPicBotBoundaryPos are derived as follows:

RefSubPicLeftBoundaryPos=subpic_ctu_top_left_x[RefSubPicIdx]*CtbSizeY

RefSubPicRightBoundaryPos=Min(picW−1, (subpic_ctu_top_left_x[RefSubPicIdx]+subpic_width_minus1[RefSubPicIdx]+1)*CtbSizeY−1)

RefSubPicTopBoundaryPos=subpic_ctu_top_left_y[RefSubPicIdx]*CtbSize

RefSubPicBotBoundaryPos=Min(picH−1, (subpic_ctu_top_left_y[RefSubPicIdx]+subpic_height_minus1[RefSubPicIdx]+1)*CtbSizeY−1)***

$$\text{xInt}_i=\text{Clip3}(\text{*Ref*SubPicLeftBoundaryPos/SubWidthC}, \text{*Ref*SubPicRightBoundaryPos/SubWidthC}, \text{xInt}\text{*}_C\text{*}+i) \quad (971)$$

$$\text{yInt}_i=\text{Clip3}(\text{*Ref*SubPicTopBoundaryPos/SubHeightC}, \text{*Ref*SubPicBotBoundaryPos/SubHeightC}, \text{yInt}\text{*}_C\text{*}+i) \quad (972)$$

Otherwise (subpic_treated_as_pic_flag[SubPicIdx] is equal to 0), the following applies:

$$xInt_i = Clip3(0, picWc-1, sps\_ref\_wraparound\_enabled\_flag?ClipH(xOffset, picWc, xInt_C+i-1): xInt_C+i-1) \quad (973)$$

$$yInt_i = Clip3(0, picHc-1, yInt_C+i-1) \quad (974)$$

The chroma locations in full-sample units $(xInt_i, yInt_i)$ are further modified as follows for i=0 . . . 3:

$$xInt_i = Clip3(xSbIntC-1, xSbIntC+sbWidth+2, xInt_i) \quad (975)$$

$$yInt_i = Clip3(ySbIntC-1, ySbIntC+sbHeight+2, yInt_i) \quad (976)$$

The predicted chroma sample value $predSampleLX_C$ is derived as follows:

If both $xFrac_C$ and $yFrac_C$ are equal to 0, and both scalingRatio[0] and scalingRatio[1] are less than 20481, the value of $predSampleLX_C$ is derived as follows:

$$predSampleLX_C = refPicLX_C[xInt_i][yInt_i] << shift3 \quad (977)$$

Otherwise, if $yFrac_C$ is equal to 0 and scalingRatio[1] is less than 20481, the value of $predSampleLX_C$ is derived as follows:

$$predSampleLX_C = (\Sigma_{i=0}^{3} f_{CH}[xFrac_C][i] * refPicLX_C[xInt_i][yInt_1]) >> shift1 \quad (978)$$

Otherwise, if $xFrac_C$ is equal to 0 and scalingRatio[0] is less than 20481, the value of $predSampleLX_C$ is derived as follows:

$$predSampleLX_C = (\Sigma_{i=0}^{3} f_{CH}[yFrac_C][i] * refPicLX_C[xInt_i][yInt_i]) >> shift1 \quad (979)$$

Otherwise, the value of $predSampleLX_C$ is derived as follows:

The sample array temp[n] with n=0 . . . 3, is derived as follows:

$$temp[n] = (\Sigma_{i=0}^{3} f_{CH}[xFrac_C][i] * refPicLX_C[xInt_i][yInt_n]) >> shift1 \quad (980)$$

The predicted chroma sample value $predSampleLX_C$ is derived as follows:

$$yFrac_C yFrac_C yFrac_C yFrac_C predSampleLX_C = (f_{CH}[\ ][0]*temp[0]+yFrac_C yFrac_C yFrac_C yFrac_C f_{CH}[\ ][1]*temp[1]+yFrac_C yFrac_C yFrac_C yFrac_C f_{CH}[\ ][2]*temp[2]+yFrac_C yFrac_C yFrac_C yFrac_C f_{CH}[\ ][3]*temp[3]) >> shift2 \quad (981)$$

Example IIB

In accordance with the techniques of the disclosure, a video coder (e.g., video encoder 200 or video decoder 300) may be configured to derive reference sub-picture boundaries in addition to the current sub-picture boundaries. In this example, the video coder may be configured to use the reference sub-picture boundaries for the clipping and the difference between the current and reference boundary positions is added in the motion compensation.

In a similar way, a video coder (e.g., video encoder 200 or video decoder 300) may be configured to modify a collocated block position for TMVP derivation by adding a difference between the left boundary positions of the reference and current sub-pictures to the horizontal collocated block position. In this example, the video coder may be configured to add a difference between the top boundary positions of the reference and current sub-pictures to the vertical collocated block position.

In accordance with the techniques of the disclosure, a video coder (e.g., video encoder 200 or video decoder 300) may replace the current picture width and height with the reference picture width and height in the reference sample clipping.

An example of such changes is provided below. Additions relative to VVC draft 7 in the Example IIB are highlighted with "**". Subtractions relative to VVC draft 7 in the Example IIB are highlighted with "→" and "←"

8.5.6.3.2 Luma Sample Interpolation Filtering Process

The variable picW is set equal to pic_width_in_luma_samples of the referenfce picture refPicLX and the variable picH is set equal to pic_height_in_luma_samples of the reference picture refPicLX.

The luma interpolation filter coefficients $fb_L[p]$ for each 1/16 fractional sample position p equal to $xFrac_L$ or $yFrac_L$ are specified in Table 28.

The luma locations in full-sample units $(xInt_i, yInt_i)$ are derived as follows for i=0 . . . 1:

If subpic_treated_as_pic_flag[SubPicIdx] is equal to 1, the following applies: **

RefSubPicIdx is derived to be such that SubpicIdList [RefSubPicIdx] of the reference picture is equal to slice_subpic_id.

The variables RefSubPicLeftBoundaryPos, RefSubPicTopBoundaryPos, RefSubPicRightBoundaryPos, and RefSubPicBotBoundaryPos are derived as follows:

RefSubPicLeftBoundaryPos=subpic_ctu_top_left_x
    [RefSubPicIdx]*CtbSizeY

RefSubPicRightBoundaryPos=Min(picW-1,(subpic_ctu_top_left_x[RefSubPicIdx]+subpic_width_minus1[RefSubPicIdx]+1)*CtbSizeY-1)

RefSubPicTopBoundaryPos=subpic_ctu_top_left_y
    [RefSubPicIdx]*CtbSize

RefSubPicBotBoundaryPos=Min(picH-1,(subpic_ctu_top_left_y[RefSubPicIdx]+subpic_height_minus1[RefSubPicIdx]+1)*CtbSizeY-1)

**

$$xInt_i = Clip3(RefSubPicLeftBoundaryPos, RefSubPicRightBoundaryPos, xInt_L+i) \quad (642)$$

$$yInt_i = Clip3(RefSubPicTopBoundaryPos, RefSubPicBotBoundaryPos, yInt_L+i) \quad (643)$$

Otherwise (subpic_treated_as_pic_flag[SubPicIdx] is equal to 0), the following applies:

$$xInt_i = Clip3(0, picW-1, sps\_ref\_wraparound\_enabled\_flag?ClipH((sps\_ref\_wraparound\_offset\_minus1+1)*MinCbSizeY, picW, (xInt_L+i)): xInt_L+i) \quad (644)$$

$$yInt_i = Clip3(0, picH-1, yInt_L+i) \quad (645)$$

8.5.6.3 Fractional Sample Interpolation Process
8.5.6.3.1 General
**

The variables leftBoundaryOffset is set equal to scaling_win_left_offset, topBoundaryOffset is set equal to scaling_win_top_offset, refSubPicLeftBoundaryPos, and refSubPicTopBoundaryPos are set equal to 0.

If subpic_treated_as_pic_flag[SubPicIdx] is equal to 1, the following applies:
leftBoundaryOffset+=SubPicLeftBoundaryPos
topBoundaryOffset+=SubPicTopBoundaryPos RefSubPicIdx is derived to be such that SubpicIdList [RefSubPicIdx] of the reference picture is equal to slice_subpic_id.

refSubPicLeftBoundaryPos=subpic_ctu_top_left_x[RefSubPicIdx]*CtbSizeY refSubPicTopBoundaryPos=subpic_ctu_top_left_y[RefSubPicIdx]*CtbSizeY

**

The variable fRefLeftOffset is set equal to ((scaling_win_left_offset+refSubPicLeftBoundaryPos )<<10), where scaling_win_left_offset is the scaling_win_left_offset for the reference picture.

The variable fRefTopOffset is set equal to ((scaling_win_top_offset+refSubPicTopBoundaryPos)<<10), where scaling_win_top_offset is the scaling_win_top_offset for the reference picture.

Let $(refxSb_L, refySb_L)$ and $(refx_L, refy_L)$ be luma locations pointed to by a motion vector (refMvLX[0], refMvLX[1]) given in 1/16-sample units. The variables $refxSb_L$, $refx_L$, $refySb_L$, and $refy_L$ are derived as follows:

$refxSb_L$=(((xSb−leftBoundaryOffset→scaling_win_left_offset←)<<4)+refMvLX[0])*scalingRatio[0]  (937)

$refx_L$=((Sign($refxSb_L$)*((Abs($refxSb_L$)+128)>>8)+$x_L$*((scalingRatio[0]+8)>>4))+fRefLeftOffset+32)>>6  (938)

$refySb_L$=(((ySb−topBoundaryOffset**→scaling_win_top_offset←)<<4)+refMvLX[1])*scalingRatio[1]  (939)

$refy_L$=((Sign($refySb_L$)*((Abs($refySb_L$)+128)>>8)+$y_L$*((scalingRatio[1]+8)>>4))+fRefTopOffset+32)>>6  (940)

The variables $xInt_L$, $yInt_L$, $xFrac_L$ and $yFrac_L$ are derived as follows:

$xInt_L$=$refx_L$>>4  (941)

$yInt_L$=$refy_L$>>4  (942)

$xFrac_L$=$refx_L$&15  (943)

$yFrac_L$=$refy_L$&15  (944)

Let $(refxSb_C, refySb_C)$ and $(refx_C, refy_C)$ be chroma locations pointed to by a motion vector (refMvLX[0], refMvLX[1]) given in 1/32-sample units. The variables $refxSb_C$, $refySb_C$, $refx_C$ and $refy_C$ are derived as follows:

addX=sps_chroma_horizontal_collocated_flag?0:8*(scalingRatio[0]−(1<<14))  (945)

addY=sps_chroma_vertical_collocated_flag?0:8*(scalingRatio[1]−(1<<14))  (946)

$refxSb_C$=(((xSb−leftBoundaryOffset→scaling_win_left_offset←)/SubWidthC<<5)+refMvLX[0]*scalingRatio[0]+addX  (947)

$refx_C$=((Sign($refxSb_C$)*((Abs($refxSb_C$)+256)>>9)+xC*((scalingRatio[0]+8)>>4))+fRefLeftOffset/SubWidthC+16)>>5  (948)

$refySb_C$=(((ySb−topBoundaryOffset→scaling_win_top_offset←)/SubHeightC<<5)+refMvLX[1]*scalingRatio[1]+addY  (949)

$refy_C$=((Sign($refySb_C$)*((Abs($refySb_C$)+256)>>9)+yC*((scalingRatio[1]+8)>>4))+fRefTopOffset/SubHeightC+16)>>5  (950)

The variables $xInt_C$, $yInt_C$, $xFrac_C$ and $yFrac_C$ are derived as follows:

$xInt_C$=$refx_C$>>5  (951)

$yInt_C$=$refy_C$>>5  (952)

$xFrac_C$=$refx_C$&31  (953)

$yFrac_C$=$refy_C$&31  (954)

Disabling Sub-Picture Reordering Example

In some examples, sub-picture reordering is disallowed from picture to picture. For example, a video coder (e.g., video encoder 200 or video decoder 300) may be configured to disallow (e.g., disable) sub-picture reordering from picture to picture. For instance, the video coder may be configured to reorder sub-pictures of all pictures of video data and/or refrain from reordering sub-pictures of a first picture of the video data differently from a second picture of the video data.

In some examples, it can be expressed that pps_subpic_id[i] shall be present in the ascending order or in the same ordering as sps_subpic_id. For example, a video coder (e.g., video encoder 200 or video decoder 300) may be configured to present a pps_subpic_id[i] in ascending order. In this example, pps_subpic_id[i] specifies the subpicture ID of the i-th subpicture in the picture parameter set. In some examples, the video coder may be configured to present a pps_subpic_id[i] in the same ordering as sps_subpic_id [i]. In this example, pps_subpic_id[i] specifies the subpicture ID of the i-th subpicture in the picture parameter set and sps_subpic_id [i] specifies that subpicture ID of the i-th subpicture in the sequence parameter set.

Similarly, for example, ph_subpic_id[i] shall be present in the ascending order or in the same ordering as pps_subpic_id or sps_subpic_id. For example, a video coder (e.g., video encoder 200 or video decoder 300) may be configured to present ph_subpic_id[i] in ascending order or the same ordering as pps_subpic_id or sps_subpic_id.

Figure 7:
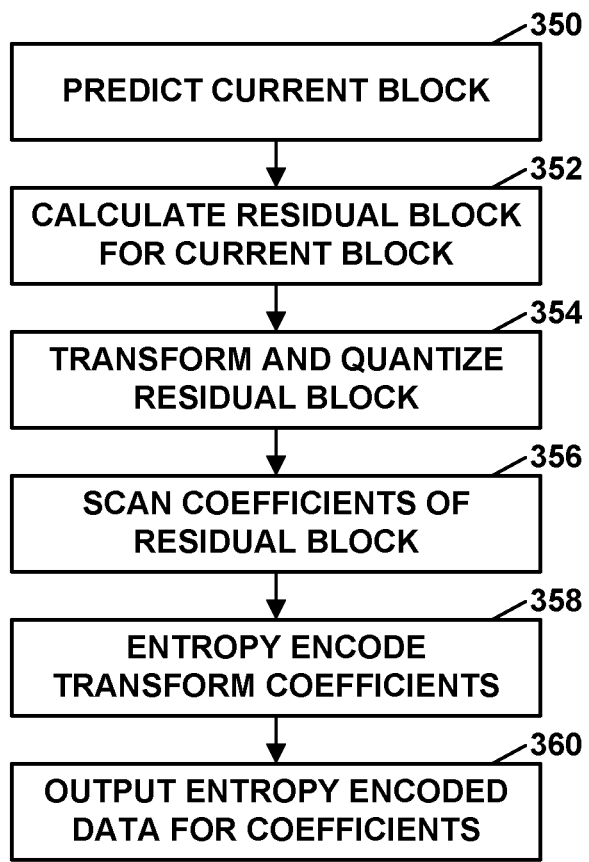
FIG. 7 is a flowchart illustrating an example method for encoding a current block.

FIG. 7 is a flowchart illustrating an example method for encoding a current block. The current block may comprise a current CU. Although described with respect to video encoder 200 (FIGS. 1 and 3), it should be understood that other devices may be configured to perform a method similar to that of FIG. 7.

In this example, video encoder 200 initially predicts the current block (350). For example, video encoder 200 may form a prediction block for the current block. For example, sample generation unit 225 of video encoder 200 may perform reference sample clipping on a reference block of a reference picture based on the size of the reference picture. In some examples, sample generation unit 225 may perform a wraparound process based on the size of the reference picture. For instance, sample generation unit 225 may generate a sample of the one or more set of reference samples based on the size of the reference picture and a wraparound offset. In this way, a coding accuracy of video encoder 200 may be improved compared to systems that may perform reference sample clipping on a reference block of a reference picture based on a current picture size and/or perform a wraparound process based on the current picture size.

Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 8:
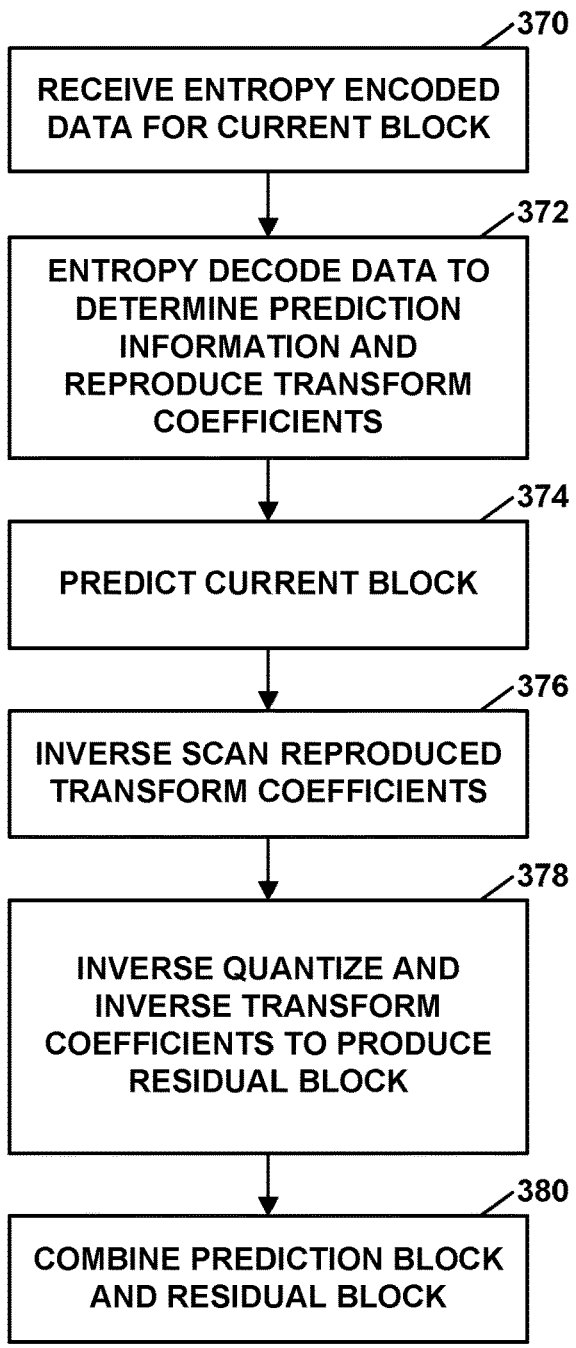
FIG. 8 is a flowchart illustrating an example method for decoding a current block of video data.

FIG. 8 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 8.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block.

For example, sample generation unit 317 of video decoder 300 may perform reference sample clipping on a reference block of a reference picture based on the size of the reference picture. In some examples, sample generation unit 317 may perform a wraparound process based on the size of the reference picture. For instance, sample generation unit 317 may generate a sample of the one or more set of reference samples based on the size of the reference picture and a wraparound offset. In this way, a coding accuracy of video decoder 300 may be improved compared to systems that may perform reference sample clipping on a reference block of a reference picture based on a current picture size and/or perform a wraparound process based on the current picture size.

Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 9:
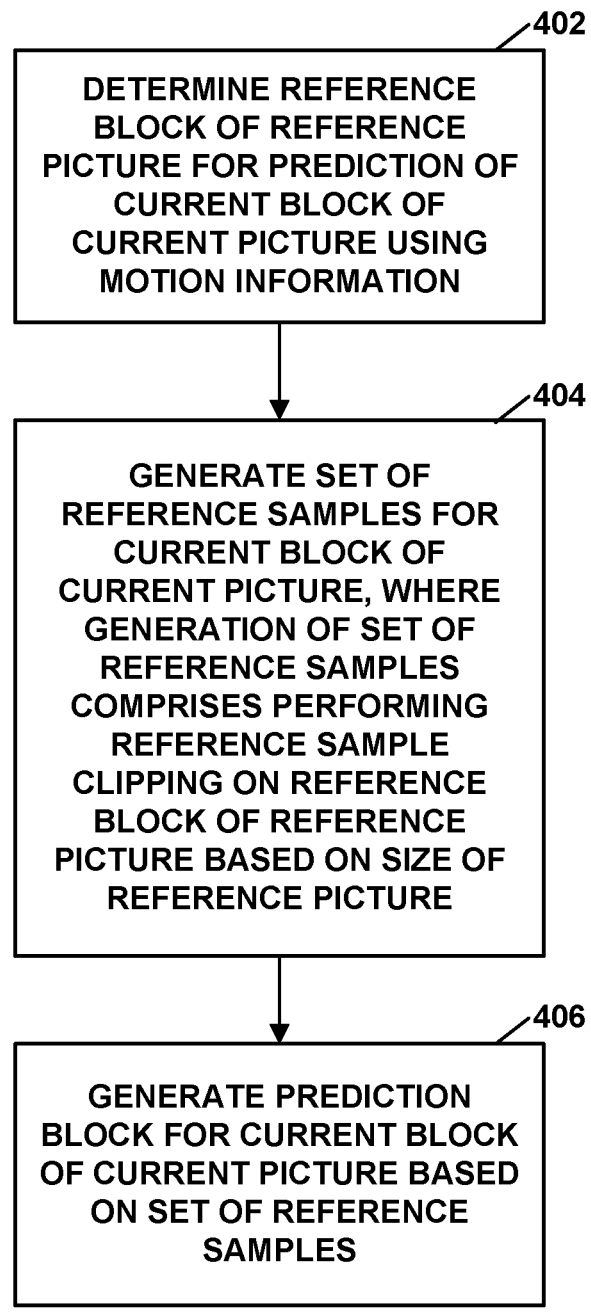
FIG. 9 is a flowchart illustrating an example method for generating a prediction block using a size of the reference picture.

FIG. 9 is a flowchart illustrating an example method for generating a prediction block using a size of the reference picture. The method of FIG. 9 may be performed by video encoder 200 or video decoder 300. For example, video encoder 200 may perform the method of FIG. 9 during a video encoding and/or decoding process (e.g., during step 350 of the method of FIG. 7, or during a decoding loop of the encoding process). As another example, video decoder 300 may perform the method of FIG. 9 during a video decoding process. In the example of FIG. 9, a video coder (e.g., mode selection unit 202 of video encoder 200 or prediction processing unit 304 of video decoder 300) may determine a reference block of a reference picture for prediction of a current block of a current picture using motion information (402).

The video coder (e.g., sample generation unit 215 of video encoder 200 or sample generation unit 317 of video decoder 300) may generate a set of reference samples for the current block of the current picture, where generating the set of reference samples comprises performing reference sample clipping on the reference block of the reference picture based on a size of the reference picture (404). The size of the reference picture may indicate a width of the reference picture in samples, a height of the reference picture in samples, or a both the width of the reference picture in samples and the height of the reference picture in samples. For example, the video coder may perform reference sample clipping on the reference block of the reference picture based on the height of the reference picture, the width of the reference picture, or both the width of the reference picture and the height of the reference picture, where width and height of the reference picture are measured in samples.

In some examples, a video coder (e.g., sample generation unit 215 of video encoder 200 or sample generation unit 317 of video decoder 300) may apply a clipping function that limits a reference sample position. For example, the video coder may apply the clipping function to limit samples to a set of samples (e.g., available samples) arranged within a reference picture. For instance, the video coder may apply a clipping function that limits positions of the reference samples along a horizontal direction of the reference picture to a minimum of 0 and a maximum of a width of the reference picture in samples minus 1 (e.g., picW−1) and along a vertical direction of the reference picture to a minimum of 0 and a maximum of a height of the reference picture in samples minus 1 (e.g., picH−1). In some examples, a size of the reference picture is different (e.g., larger or smaller) than a size of the current picture.

In some examples, a video coder (e.g., video encoder 200 or video decoder 300) may perform wraparound processing based on the size of the reference picture. For example, the video coder may generate a sample of the one or more set of reference samples based on the size of the reference picture and a wraparound offset. For instance, the video coder may calculate ClipH((sps_ref_wraparound_offset_minus1+1) *MinCbSizeY, picW, (xIntL+i)), where clipH is a function that adds the wraparound offset as modified by the minimum coding block size (e.g., MinCbSizeY) to a luma location (e.g., xIntL).

The video coder (e.g., mode selection unit 202 of video encoder 200 or prediction processing unit 304 of video decoder 300) may generate a prediction block for the current block of the current picture based on the set of reference samples (406).

In some examples, a video decoder (e.g., video decoder 300) may decode a residual block for the current block of the current picture and decode the current block of the current picture using the prediction block and the residual block. For example, video decoder 300 may combine the prediction block with the residual block on a sample-by-sample basis. Similarly, a video encoder (e.g., video encoder 200) may decode a residual block for the current block of the current picture and decode the current block of the current picture using the prediction block and the residual block. In some examples, a video encoder (e.g., video encoder 200) may generate a residual block for the current block of the current picture using the current block of the current picture and the prediction block and encode the residual block.

Figure 10:
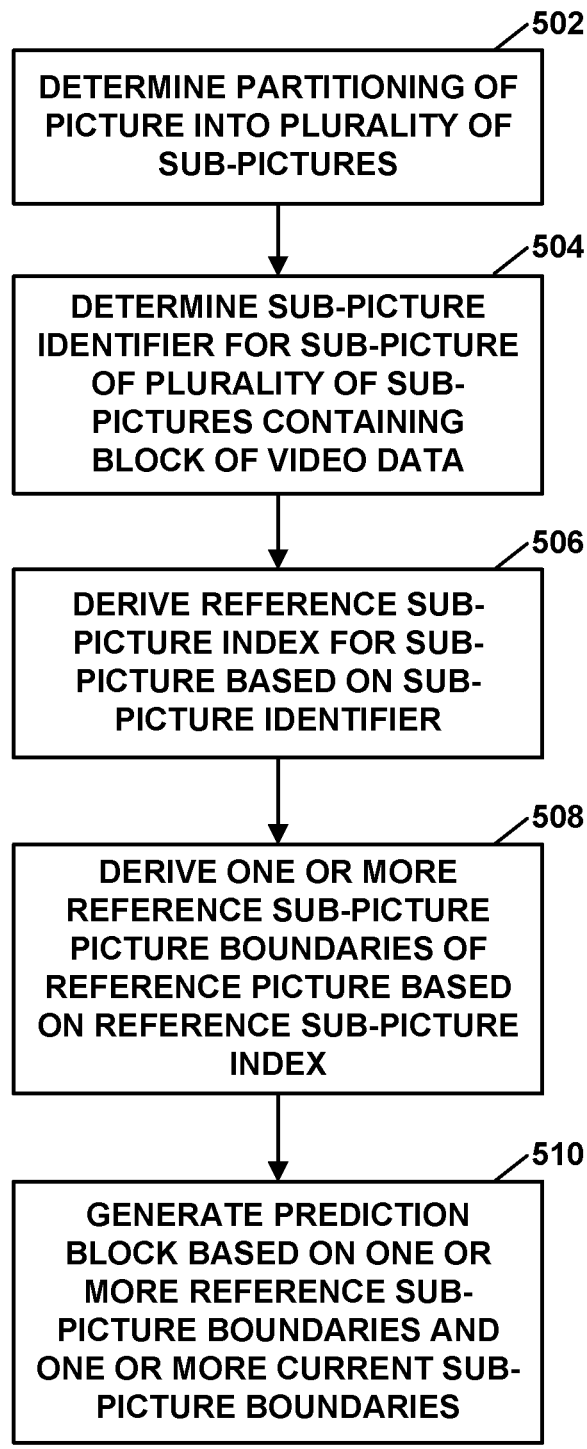
FIG. 10 is a flowchart illustrating an example method for generating a prediction block using reference sub-picture picture boundaries.

FIG. 10 is a flowchart illustrating an example method for generating a prediction block using reference sub-picture picture boundaries. The method of FIG. 10 may be performed by video encoder 200 or video decoder 300. For example, video encoder 200 may perform the method of FIG. 10 during a video encoding and/or decoding process (e.g., during step 350 of the method of FIG. 7, or during a decoding loop of the encoding process). As another example, video decoder 300 may perform the method of FIG. 10 during a video decoding process. The method of FIG. 10 may be used with the method of FIG. 9 or alternatively from the method of FIG. 9.

In the example of FIG. 10, a video coder (e.g., mode selection unit 202 of video encoder 200 or prediction processing unit 304 of video decoder 300) may determine a partitioning of a picture into a plurality of sub-pictures (502). For example, video decoder 300 may determine a sub-picture mapping specified for the reference picture based on a sub-picture mapping specified for the picture. For instance, video decoder 300 may determine the sub-picture mapping specified for the reference picture based on signaling information in a picture parameter set (PPS) or picture header (PH) for the reference picture and determine the partitioning of the reference picture based on the sub-picture mapping specified for the reference picture. In some examples, a video decoder may determine a sub-picture partitioning layout for the picture using signaling information in a sequence parameter set (SPS) and determine the partitioning of the reference picture based on the sub-picture partitioning layout. In some examples, a video encoder (e.g., video encoder 200) may partition the picture into the plurality of sub-pictures.

A video coder (e.g., video encoder 200 or video decoder 300) may determine a sub-block identifier for a sub-picture of the plurality of sub-pictures containing a block of the video data (504). In some examples, the sub-picture identifier includes slice_subpic_id. In some examples, the video coder may determine the sub-picture identifier based on the slice_subpic_id signaled in a slice header (SH).

A video coder (e.g., video encoder 200 or video decoder 300) may derive a reference sub-picture index for the sub-picture based on the sub-picture identifier (506). For example, the video coder may derive the reference sub-picture index for the sub-picture to which the sub-picture identifier is mapped. For instance, the video code may derive RefSubPicIdx such that SubpicIdList[RefSubPicIdx] of the reference picture is equal to slice_subpic_id. The slice_subpic_id may be signaled in a slice header to identify a sub-picture.

A video coder (e.g., video encoder 200 or video decoder 300) may derive one or more reference sub-picture picture boundaries of a reference picture based on the reference sub-picture index (508). For example, the video coder may calculate the following:

RefSubPicLeftBoundaryPos=subpic_ctu_top_left_x[RefSubPicIdx]*CtbSizeY

RefSubPicRightBoundaryPos=Min(picW−1, (subpic_ctu_top_left_x[RefSubPicIdx]+subpic_width_minus1[RefSubPicIdx]+1) *CtbSizeY−1)

RefSubPicTopBoundaryPos=subpic_ctu_top_left_y[RefSubPicIdx]*CtbSize

RefSubPicBotBoundaryPos=Min(picH−1, (subpic_ctu_top_left_y[RefSubPicIdx]+subpic_height_minus1[RefSubPicIdx]+1) *CtbSizeY−1)

wherein RefSubPicLeftBoundaryPos is a left boundary of the one or more reference picture boundaries, RefSubPicRightBoundaryPos is a right boundary of the one or more reference picture boundaries, RefSubPicTopBoundaryPos is a top boundary of the one or more reference picture boundaries, RefSubPicBotBoundaryPos is a bottom boundary of the one or more reference picture boundaries, subpic_ctu_top_left_x[RefSubPicIdx] is a top left corner of the reference picture, CtbSizeY is a height of a coding tree block for the video data, CtbSizeY is a height of a coding tree block for the video data, picW is a width of the picture, subpic_width_minus1[RefSubPicIdx] is a width of the sub-picture minus 1, CtbSize is a size of the coding tree block, PicH is a height of the picture, subpic_height_minus1[RefSubPicIdx] is a height of the sub-picture minus 1.

In some examples, a video coder (e.g., video encoder 200 or video decoder 300) may perform reference sample clipping using the reference sub-picture picture boundaries. For example, the video coder may calculate the following.

$xInti =$ $Clip3(RefSubPicLeftBoundaryPos, RefSubPicRightBoundaryPos, xIntL + i)$ $yInti =$ $Clip3(RefSubPicTopBoundaryPos, RefSubPicBotBoundaryPos, yIntL + i)$ wherein $clip3$ is a function $Clip3(x, y, z) = \begin{cases} x; & z < x \\ y; & z > y \\ z; & \text{otherwise} \end{cases}$ wherein, $(xInt_i, yInt_i)$ are luma locations in full-sample units, RefSubPicLeftBoundaryPos is a left boundary of the one or more reference picture boundaries, RefSubPicRightBoundaryPos is a right boundary of the one or more reference picture boundaries, RefSubPicTopBoundaryPos is a top boundary of the one or more reference picture boundaries, RefSubPicBotBoundaryPos is a bottom boundary of the one or more reference picture boundaries.

The video coder may generate a prediction block based on the one or more reference sub-picture boundaries and one or more current sub-picture boundaries (510). For example, the video coder may derive a displacement offset for motion compensation based on the one or more reference picture boundaries of the reference picture. In this example, the video coder may generate the prediction block for the block of the video data generated based on the displacement offset for motion compensation. In this case, the accuracy of the computation can be increased compared to systems that do not use one or more reference sub-picture boundaries and one or more current sub-picture boundaries because the position derivation may be done with a higher precision, for example MV accuracy may be 1/16 pel (1/16 of integer sample position). In some examples, the video coder may adding the displacement offset for motion compensation to a scaling window offset.

In some examples, a video coder (e.g., video encoder 200 or video decoder 300) may generate a TMVP using the one or more reference sub-picture boundaries and one or more current sub-picture boundaries. In some examples, the video coder may add a difference between a position of a current sub-picture and a reference sub-picture are added. For example, the video coder may calculate colPos=blockPos−curSubPicBoundaryPos+refSubPicBoundaryPos, wherein colPos is the corrected collocated block position, blockPos is a current block position in the current sub-picture, curSubPicBoundaryPos is the one or more current sub-picture boundaries, and refSubPicBoundaryPos is the one or more reference sub-picture boundaries. Using the corrected collocated block position may improve a coding accuracy of the video coder.

In some examples, a video coder (e.g., video encoder 200 or video decoder 300) may determine whether the sub-picture is treated (e.g., encoded or decoded) as an entire picture type based on signaling information. In this example, the video coder may derive the one or more reference picture boundaries in response to determining that the sub-picture is treated as the entire picture type.

In some examples, a video coder (e.g., video encoder 200 or video decoder 300) may determine whether the sub-picture is treated as an entire picture type when subpic_treated_as_pic_flag[SubPicIdx] is equal to 1. In this example, the video coder may derive the one or more reference picture boundaries in response to determining that the sub-picture is treated as the entire picture type.

The following clauses are a non-limiting list of examples in accordance with one or more techniques of this disclosure.

Clause 1. A method of processing video data, the method comprising: partitioning a picture into a plurality of sub-pictures based on a sub-picture mapping specified for the picture; determining a sub-picture identifier for a sub-picture of the plurality of sub-pictures containing a block of the video data; deriving a reference sub-picture index for the sub-picture based on the sub-picture identifier; deriving one or more reference picture boundaries of a reference picture based on the reference sub-picture index; performing reference sample clipping on a reference block identified by motion information for the block of the video data based on the one or more reference picture boundaries of the reference picture to generate a set of reference samples for the block of the video data; and generating a prediction block for the block of the video data based on the set of reference samples.

Clause 2. The method of clause 1, wherein the block of the video data is included in a slice of the video data.

Clause 3. The method of any combination of clauses 1-2, further comprising: determining a sub-picture mapping specified for the reference picture based on signaling information in a picture parameter set (PPS) or picture header (PH) for the reference picture; and partitioning the reference picture based on the sub-picture mapping specified for the reference picture.

Clause 4. The method of any combination of clauses 1-3, further comprising determining a sub-picture partitioning layout for the picture using signaling information in a sequence parameter set (SPS), wherein the partitioning of the picture is based on the sub-picture partitioning layout.

Clause 5. The method of any combination of clauses 1-4, wherein the sub-picture identifier includes slice_subpic_id, and wherein determining the sub-picture identifier is based on the slice_subpic_id signaled in a slice header (SH).

Clause 6. The method of any combination of clauses 1-5, wherein deriving the reference sub-picture index for the sub-picture comprises deriving the reference sub-picture index for the sub-picture to which the sub-picture identifier is mapped.

Clause 7. The method of any combination of clauses 1-6, wherein deriving the one or more reference picture boundaries of the reference picture comprises calculating:

RefSubPicLeftBoundaryPos=subpic_ctu_top_left_x
[RefSubPicIdx]* CtbSizeY

RefSubPicRightBoundaryPos=Min(picW−1,(sub-
pic_ctu_top_left_x[RefSubPicIdx]+sub-
pic_width_minus1[RefSubPicIdx]+1)*Ctb-
SizeY−1)

RefSubPicTopBoundaryPos=subpic_ctu_top_lefty
[RefSubPicIdx]*CtbSize

RefSubPicBotBoundaryPos=Min(picH−1,(subpic_c-
tu_top_left_y[RefSubPicIdx]+subpic_height_mi-
nus1[RefSubPicIdx]+1)*CtbSizeY−1), wherein RefSubPicLeftBoundaryPos is a left boundary of the one or more reference picture boundaries, RefSubPicRightBoundaryPos is a right boundary of the one or more reference picture boundaries, RefSubPicTopBoundaryPos is a top boundary of the one or more reference picture boundaries, RefSubPicBotBoundaryPos is a bottom boundary of the one or more reference picture boundaries, subpic_ctu_top_left_x[RefSubPicIdx] is a top left corner of the reference picture, CtbSizeY is a height of a coding tree block for the video data, CtbSizeY is a height of a coding tree block for the video data, picW is a width of the picture, subpic_width_minus1[RefSubPicIdx] is a width of the sub-picture minus 1, CtbSize is a size of the coding tree block, PicH is a height of the picture, subpic_height_minus1[RefSubPicIdx] is a height of the sub-picture minus 1.

Clause 8. The method of any combination of clauses 1-7, wherein performing reference sample clipping comprises calculating: xInti=Clip3(RefSubPicLeftBoundaryPos, RefSubPicRightBoundaryPos, xIntL+i)

yInti=Clip3(RefSubPicTopBoundaryPos, RefSubPicBotBoundaryPos, yIntL+i) wherein clip3 is a function Clip3(x, y, z)={■("x" &";" &"z<x" @"y" &";" &"z>y" @"z" &";" &"otherwise" wherein, (xInti, yInti) are luma locations in full-sample units, RefSubPicLeftBoundaryPos is a left boundary of the one or more reference picture boundaries, RefSubPicRightBoundaryPos is a right boundary of the one or more reference picture boundaries, RefSubPicTopBoundaryPos is a top boundary of the one or more reference picture boundaries, RefSubPicBotBoundaryPos is a bottom boundary of the one or more reference picture boundaries.

Clause 9. The method of any combination of clauses 1-8, further comprising determining whether the sub-picture is treated as an entire picture type based on signaling information, wherein deriving the one or more reference picture boundaries is in response to determining that the sub-picture is treated as the entire picture type.

Clause 10. The method of any combination of clauses 1-9, further comprising determining whether the sub-picture is treated as an entire picture type when subpic_treated_as_pic_flag[SubPicIdx] is equal to 1, wherein deriving the one or more reference picture boundaries is in response to determining that the sub-picture is treated as the entire picture type.

Clause 11. The method of any combination of clauses 1-10, further comprising deriving a displacement offset for motion compensation based on the one or more reference picture boundaries of the reference picture, wherein the prediction block for the block of the video data is generated based on the displacement offset for motion compensation.

Clause 12. The method of clause 11, wherein generating the prediction block for the block of the video data comprises adding the displacement offset for motion compensation to a scaling window offset.

Clause 13. The method of any combination of clauses 1-12, further comprising determining a reference picture size of the reference picture, wherein performing the reference sampling clipping comprises using the reference picture size.

Clause 14. The method of any combination of clauses 1-13, further comprising: determining a reference picture size of the reference picture; and using the reference picture size in wraparound processing.

Clause 15. The method of any combination of clauses 1-14, further comprising: determining a reference picture size of the reference picture; and modifying a picture size for the picture to correspond to the reference picture size.

Clause 16. A method comprising: partitioning a picture into a plurality of current sub-pictures based on a sub-picture mapping specified for the picture; determining a sub-picture identifier for a current sub-picture of the plurality of current sub-pictures containing a block of the video data; deriving a reference sub-picture index for the current sub-picture based on the sub-picture identifier; deriving one or more reference picture boundaries of a reference picture based on the reference sub-picture index; determining a corrected collocated block position using the one or more reference sub-picture boundaries and one or more current sub-picture boundaries of the sub-picture; and generating a prediction block for the block of the video data based on the corrected collocated block position.

Clause 17. The method of clause 16, wherein determining the corrected collocated block position comprises calculating:

$$colPos = blockPos - curSubPicBoundaryPos + refSubPicBoundaryPos,$$

wherein colPos is the corrected collocated block position, blockPos is a current block position in the current sub-picture, curSubPicBoundaryPos is the one or more current sub-picture boundaries, and refSubPicBoundaryPos is the one or more reference sub-picture boundaries.

Clause 18. The method of any one of clauses 16-17, comprising comparing the corrected collocated block position to a bottom boundary position of the reference sub-picture and/or a right boundary position of the reference sub-picture.

Clause 19. A method comprising: partitioning a first picture of video data into a first plurality of sub-pictures arranged in a first order that is in ascending order and/or corresponding to a sequence parameter set order for the first plurality of sub-pictures; partitioning a second picture of the video data into a second plurality of sub-pictures arranged in a second order that is in the ascending order and/or corresponding to a sequence parameter set order for the second plurality of sub-pictures; refraining from reordering the first plurality of the sub-pictures of the first picture from the first order and from reordering the second plurality of the sub-pictures of the second picture from the second order; generating a first prediction block for a first block of a sub-picture of the first plurality of sub-pictures using the first plurality of sub-pictures arranged in the first order; and generating a second prediction block for a second block of a sub-picture of the second plurality of sub-pictures using the second plurality of sub-pictures arranged in the second order.

Clause 20. The method of any combination of clauses 1-19, further comprising: decoding a residual block for the block of the video data; and decoding the block of the video data using the prediction block and the residual block.

Clause 21. The method of any combination of clauses 1-20, further comprising: generating a residual block for the block of the video data using the block of the video data and the prediction block; and encoding the residual block.

Clause 22. A device for coding video data, the device comprising one or more means for performing the method of any of clauses 1-21.

Clause 23. The device of clause 22, wherein the one or more means comprise one or more processors implemented in circuitry.

Clause 24. The device of any of clauses 22 and 23, further comprising a memory to store the video data.

Clause 25. The device of any of clauses 22-24, further comprising a display configured to display decoded video data.

Clause 26. The device of any of clauses 22-25, wherein the device comprises one or more of a camera, a computer, a mobile device, a broadcast receiver device, or a set-top box.

Clause 27. The device of any of clauses 22-26, wherein the device comprises a video decoder.

Clause 28. The device of any of clauses 22-27, wherein the device comprises a video encoder.

Clause 29. A computer-readable storage medium having stored thereon instructions that, when executed, cause one or more processors to perform the method of any of clauses 1-21.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising: determining a reference block of a reference picture for prediction of a current block of a current picture using motion information; generating a set of reference samples for the current block of the current picture, wherein generating the set of reference samples comprises performing wraparound processing based on a size of the reference picture and performing reference sample clipping on the reference block of the reference picture based on the size of the reference picture; and generating a prediction block for the current block of the current picture based on the set of reference samples; and wherein performing the wraparound processing comprises generating a sample of the one or more set of reference samples based on the size of the reference picture and a wraparound offset.

2. The method of claim 1, wherein the size of the reference picture comprises a width of the reference picture in samples.

3. The method of claim 1, wherein the size of the reference picture comprises a height of the reference picture in samples.

4. The method of claim 1, wherein performing reference sample clipping on the reference block comprises applying a clipping function that limits positions of the reference samples along a horizontal direction of the reference picture to a minimum of 0 and a maximum of a width of the reference picture in samples minus 1 and along a vertical direction of the reference picture to a minimum of 0 and a maximum of a height of the reference picture in samples minus 1.

5. The method of claim 1, wherein generating the set of reference samples comprises performing wraparound processing based on the size of the reference picture.

6. The method of claim 5, wherein performing the wraparound processing comprises generating a sample of the one or more set of reference samples based on the size of the reference picture and a wraparound offset.

7. The method of claim 1, wherein the size of the reference picture is different than a size of the current picture.

8. The method of claim 1, further comprising:
decoding a residual block for the current block of the current picture; and
decoding the current block of the current picture using the prediction block and the residual block.

9. The method of claim 1, further comprising:
generating a residual block for the current block of the current picture using the current block of the current picture and the prediction block; and
encoding the residual block.

10. The method of claim 1, wherein the size of the reference picture is the same as a size of the current picture.

11. A device configured to decode video data comprising: a memory configured to store video data; and one or more processors implemented in circuitry and configured to: determine a reference block of a reference picture for prediction of a current block of a current picture using motion information;
generate a set of reference samples for the current block of the current picture, wherein, to generate the set of reference samples, the one or more processors are configured to perform wraparound processing based on a size of the reference picture and perform reference sample clipping on the reference block of the reference picture based on the size of the reference picture; and generate a prediction block for the current block of the current picture based on the set of reference samples, and wherein, to perform the wraparound processing, the one or more processors are configured to generate a sample of the one or more set of reference samples based on the size of the reference picture and a wraparound offset.

12. The device of claim 11, wherein the size of the reference picture comprises a width of the reference picture in samples.

13. The device of claim 11, wherein the size of the reference picture comprises a height of the reference picture in samples.

14. The device of claim 11, wherein, to perform reference sample clipping on the reference block, the one or more processors are configured to apply a clipping function that limits positions of the reference samples along a horizontal direction of the reference picture to a minimum of 0 and a maximum of a width of the reference picture in samples minus 1 and along a vertical direction of the reference picture to a minimum of 0 and a maximum of a height of the reference picture in samples minus 1.

15. The device of claim 11, wherein, to generate the set of reference samples, the one or more processors are configured to perform wraparound processing based on the size of the reference picture.

16. The device of claim 15, wherein, to perform the wraparound processing, the one or more processors are configured to generate a sample of the one or more set of reference samples based on the size of the reference picture and a wraparound offset.

17. The device of claim 11, wherein the size of the reference picture is different than a size of the current picture.

18. The device of claim 11, wherein the one or more processors are configured to:
  decode a residual block for the current block of the current picture; and
  decode the current block of the current picture using the prediction block and the residual block.

19. The device of claim 11, wherein the one or more processors are configured to:
  generate a residual block for the current block of the current picture using the current block of the current picture and the prediction block; and
  encode the residual block.

20. The device of claim 11, further comprising a display configured to display the video data.

21. The device of claim 11, wherein the device comprises one or more of a camera, a computer, a mobile device, a broadcast receiver device, a set-top box, an integrated circuit, a microprocessor, or a wireless communication device.

22. The device of claim 11, further comprising a camera configured to capture the video data.

23. The device of claim 11, wherein the size of the reference picture is the same as a size of the current picture.

24. A non-transitory computer-readable storage medium having stored thereon instructions that, when executed, cause a processor to: determine a reference block of a reference picture for prediction of a current block of a current picture using motion information; generate a set of reference samples for the current block of the current picture, wherein, to generate the set of reference samples, the instructions cause the processor to perform wraparound processing based on a size of the reference picture and perform reference sample clipping on the reference block of the reference picture based on the size of the reference picture; and generate a prediction block for the current block of the current picture based on the set of reference samples, and wherein, to perform the wraparound processing, the instructions cause the processor to generate a sample of the one or more set of reference samples based on the size of the reference picture and wraparound offset.

25. The non-transitory computer-readable storage medium of claim 24, wherein the size of the reference picture comprises a width of the reference picture in samples.

26. The non-transitory computer-readable storage medium of claim 24, wherein the size of the reference picture comprises a height of the reference picture in samples.

27. The non-transitory computer-readable storage medium of claim 24, wherein, to perform reference sample clipping on the reference block, the instructions cause the processor to apply a clipping function that limits positions of the reference samples along a horizontal direction of the reference picture to a minimum of 0 and a maximum of a width of the reference picture in samples minus 1 and along a vertical direction of the reference picture to a minimum of 0 and a maximum of a height of the reference picture in samples minus 1.

28. The non-transitory computer-readable storage medium of claim 24, wherein, to generate the set of reference samples, the instructions cause the processor to perform wraparound processing based on the size of the reference picture.

29. The non-transitory computer-readable storage medium of claim 28, wherein, to perform the wraparound processing, the instructions caused the processor to generate a sample of the one or more set of reference samples based on the size of the reference picture and a wraparound offset.

30. The non-transitory computer-readable storage medium of claim 24, wherein the size of the reference picture is different than a size of the current picture.

31. The non-transitory computer-readable storage medium of claim 24, wherein the instructions further cause the processor to:
  decode a residual block for the current block of the current picture; and
  decode the current block of the current picture using the prediction block and the residual block.

32. The non-transitory computer-readable storage medium of claim 24, wherein the instructions further cause the processor to:
  generate a residual block for the current block of the current picture using the current block of the current picture and the prediction block; and
  encode the residual block.

33. The non-transitory computer-readable storage medium of claim 24, wherein the size of the reference picture is the same as a size of the current picture.

34. A device configured to decode video data comprising: means for determining a reference block of a reference picture for prediction of a current block of a current picture using motion information; means for generating a set of reference samples for the current block of the current picture, wherein, the means for generating the set of reference samples comprises means for performing wraparound processing based on a size of the reference picture and means for performing reference sample clipping on the reference block of the reference picture based on the size of the reference picture; and means for generating a prediction block for the current block of the current picture based on the set of reference samples, wherein the means for performing the wraparound processing comprises means for generating a sample of the one or more set of reference samples based on the size of the reference picture and a wraparound offset.

35. The device of claim 34, wherein the size of the reference picture comprises a width of the reference picture in samples.

36. The device of claim 34, wherein the size of the reference picture comprises a height of the reference picture in samples.

37. The device of claim 34, wherein the means for performing reference sample clipping on the reference block comprises means for applying a clipping function that limits positions of the reference samples along a horizontal direction of the reference picture to a minimum of 0 and a maximum of a width of the reference picture in samples minus 1 and along a vertical direction of the reference picture to a minimum of 0 and a maximum of a height of the reference picture in samples minus 1.

38. The device of claim 34, wherein the means for generating the set of reference samples comprises means for performing wraparound processing based on the size of the reference picture.

39. The device of claim 38, wherein the means for performing the wraparound processing comprises for generating a sample of the one or more set of reference samples based on the size of the reference picture and a wraparound offset.

40. The device of claim 34, wherein the size of the reference picture is different than a size of the current picture.

41. The device of claim 34, further comprising:
  means for decoding a residual block for the current block of the current picture; and means for decoding the current block of the current picture using the prediction block and the residual block.

42. The device of claim 34, wherein further comprising:
means for generating a residual block for the current block of the current picture using the current block of the current picture and the prediction block; and
means for encoding the residual block.

43. The device of claim 34, wherein the size of the reference picture is the same as a size of the current picture.

* * * * *